US012659735B2

(12) United States Patent
Kunz et al.

(10) Patent No.: US 12,659,735 B2
(45) Date of Patent: Jun. 16, 2026

(54) SUPPORTING REMOTE UNIT REAUTHENTICATION

(71) Applicant: Lenovo (Singapore) Pte. Ltd., New Tech Park (SG)

(72) Inventors: Andreas Kunz, Ladenburg (DE); Apostolis Salkintzis, Athens (GR); Sheeba Backia Mary Baskaran, Friedrichsdorf (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 697 days.

(21) Appl. No.: 18/008,408

(22) PCT Filed: Jun. 5, 2020

(86) PCT No.: PCT/EP2020/065682
§ 371 (c)(1),
(2) Date: Dec. 5, 2022

(87) PCT Pub. No.: WO2021/244758
PCT Pub. Date: Dec. 9, 2021

(65) Prior Publication Data
US 2023/0247423 A1     Aug. 3, 2023

(51) Int. Cl.
*H04W 12/06*     (2021.01)
*H04L 9/40*      (2022.01)
(Continued)

(52) U.S. Cl.
CPC ........... *H04W 12/06* (2013.01); *H04L 63/164* (2013.01); *H04W 12/041* (2021.01);
(Continued)

(58) Field of Classification Search
CPC ............... H04W 12/06; H04W 12/041; H04W 12/0433; H04W 12/084; H04W 12/086; H04L 63/164
See application file for complete search history.

(56) References Cited

U.S. PATENT DOCUMENTS

2012/0102146 A1*   4/2012   Wu ..................... H04L 63/0892
                                                          709/217
2016/0014689 A1*   1/2016   Malinen ............. H04W 12/086
                                                          455/434
(Continued)

OTHER PUBLICATIONS

PCT/EP2020/065682, "Notification of Transmittal of the International Search Report and the Written Opinion of the International Searching Authority, or the Declaration", International Searching Authority, Feb. 25, 2021, pp. 1-14.
(Continued)

*Primary Examiner* — Mazda Sabouri
(74) *Attorney, Agent, or Firm* — Kunzler Needham Hilton

(57) ABSTRACT

Apparatuses, methods, and systems are disclosed for supporting remote unit reauthentication. One apparatus apparatus includes a processor and a transceiver that sends a first authentication message to a network function in a mobile communication network and receives a second authentication message from the network function in response to the first authentication message. Here, the first authentication message contains an indicator that the apparatus supports EAP Reauthentication Protocol and the second authentication message contains a key management domain name indicating a group of network functions that can share reauthentication security context. The processor derives reauthentication security context in response to successful authentication with the mobile communication network and locally stores the received key management domain name and the derived reauthentication security context for subse-
(Continued)

quent reauthentication with the mobile communication network.

20 Claims, 16 Drawing Sheets

(51) Int. Cl.

| | |
|---|---|
| *H04W 12/041* | (2021.01) |
| *H04W 12/0433* | (2021.01) |
| *H04W 12/084* | (2021.01) |
| *H04W 12/086* | (2021.01) |

(52) U.S. Cl.
CPC ..... *H04W 12/0433* (2021.01); *H04W 12/084* (2021.01); *H04W 12/086* (2021.01)

(56) References Cited

U.S. PATENT DOCUMENTS

2020/0359218 A1* 11/2020 Lee ........................ H04W 12/63
2022/0377546 A1* 11/2022 Mazinani .............. H04W 12/10

OTHER PUBLICATIONS

Orange et al., "Addition of ERP support for TWAN Interworking", 3GPP TSG CT4 Meeting #76 C4-171333, Feb. 13-17, 2017, pp. 1-41.

Cao China Mobile B He Catr Y Shi Q Wu Z et al: "EAP Extensions for the EAP Re-authentication Protocol (ERP); rfc6696.txt", EAP Extensions for the EAP Re-Authentication Protocol (ERP); RFC6696. TXT, Internet Engineering Task Force, IETF; Standard, Internet Society (ISOC) 4, Rue Des Falaises Ch-1205 Geneva, Switzerland, Jul. 26, 2012 (Jul. 26, 2012), pp. 1-47, XPO15086398, [retrieved on Jul. 26, 2012] pp. 6, 8, 12 figure 1.
Pacyna Piotr et al: "Evaluation of EAP re-authentication protocol", 2016 17th International Telecommunications Network Strategy and Planning Symposium (Networks), IEEE, Sep. 26, 2016 (Sep. 26, 2016), pp. 45-49, XP033003496, DOI: 10.1109/NETWKS.2016. 7751151 [retrieved on Nov. 21, 2016] the whole document.
Xiao Zheng et al: "Handover keying and its uses", IEEE Network, IEEE Service Center, New York, NY, US, vol. 23, No. 2, Mar. 2009 (Mar. 2009), pp. 27-34, XPO11267927, ISSN: 0890-8044, DOI: 10.1109/MNET.2009.4804333 p. 30-p. 32.
3GPP, "3rd Generation Partnership Project; Technical Specification Group Services and System Aspects; System architecture for the 5G System (5GS); Stage 2 (Release 16)", 3GPP TS 23.501 V16.4.0, Mar. 2020, pp. 1-430.
3GPP, "3rd Generation Partnership Project; Technical Specification Group Services and System Aspects; 3GPP System Architecture Evolution (SAE); Security aspects of non-3GPP accesses (Release 15)", 3GPP TS 33.402 V15.1.0, Jun. 2018, pp. 1-72.
3GPP, "3rd Generation Partnership Project; Technical Specification Group Services and System Aspects; Security architecture and procedures for 5G system (Release 16)", 3GPP TS 33.501 V16.2.0, Mar. 2020, pp. 1-227.

* cited by examiner

900

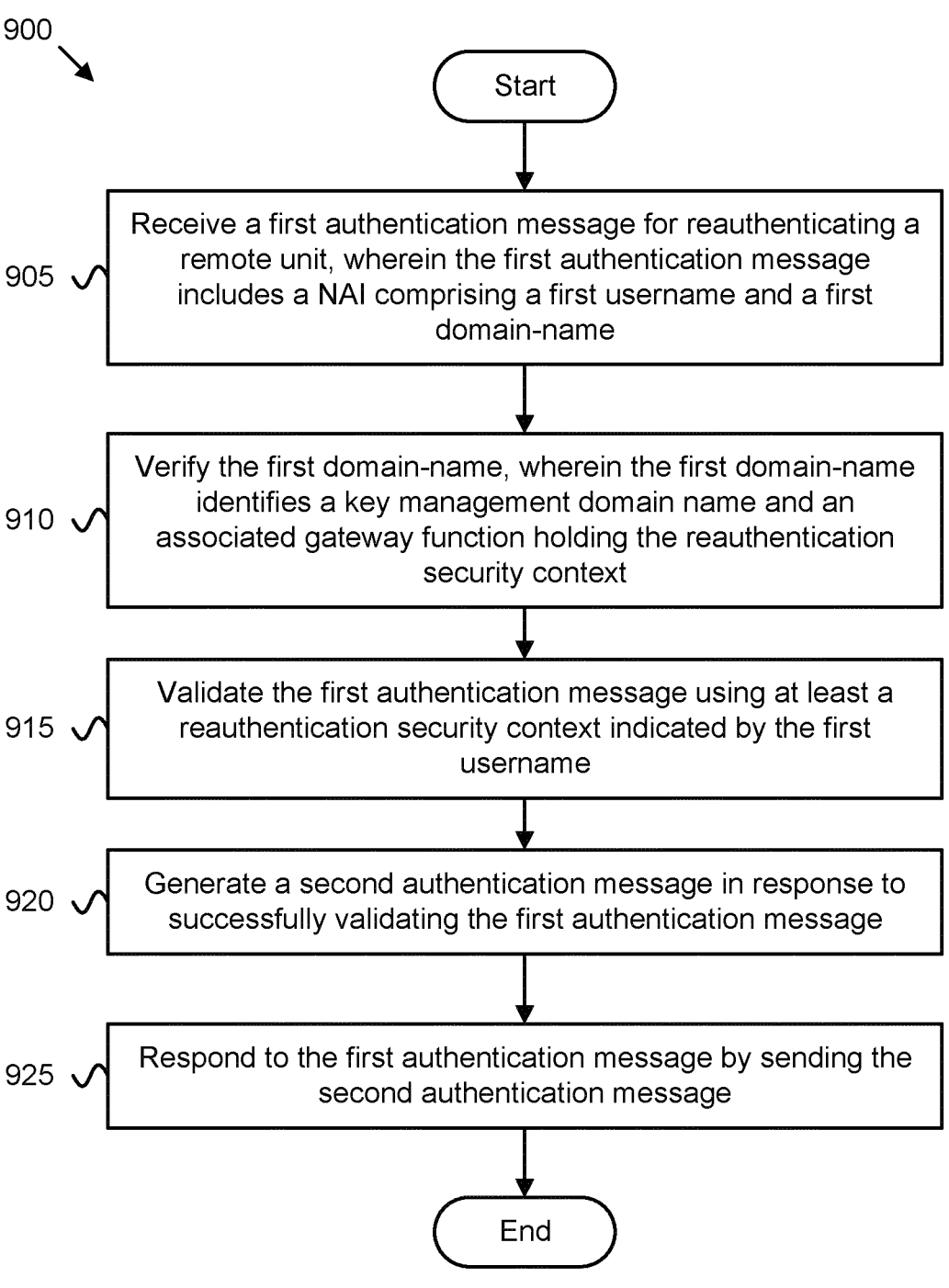

Start

905    Receive a first authentication message for reauthenticating a remote unit, wherein the first authentication message includes a NAI comprising a first username and a first domain-name 910    Verify the first domain-name, wherein the first domain-name identifies a key management domain name and an associated gateway function holding the reauthentication security context 915    Validate the first authentication message using at least a reauthentication security context indicated by the first username 920    Generate a second authentication message in response to successfully validating the first authentication message 925    Respond to the first authentication message by sending the second authentication message End

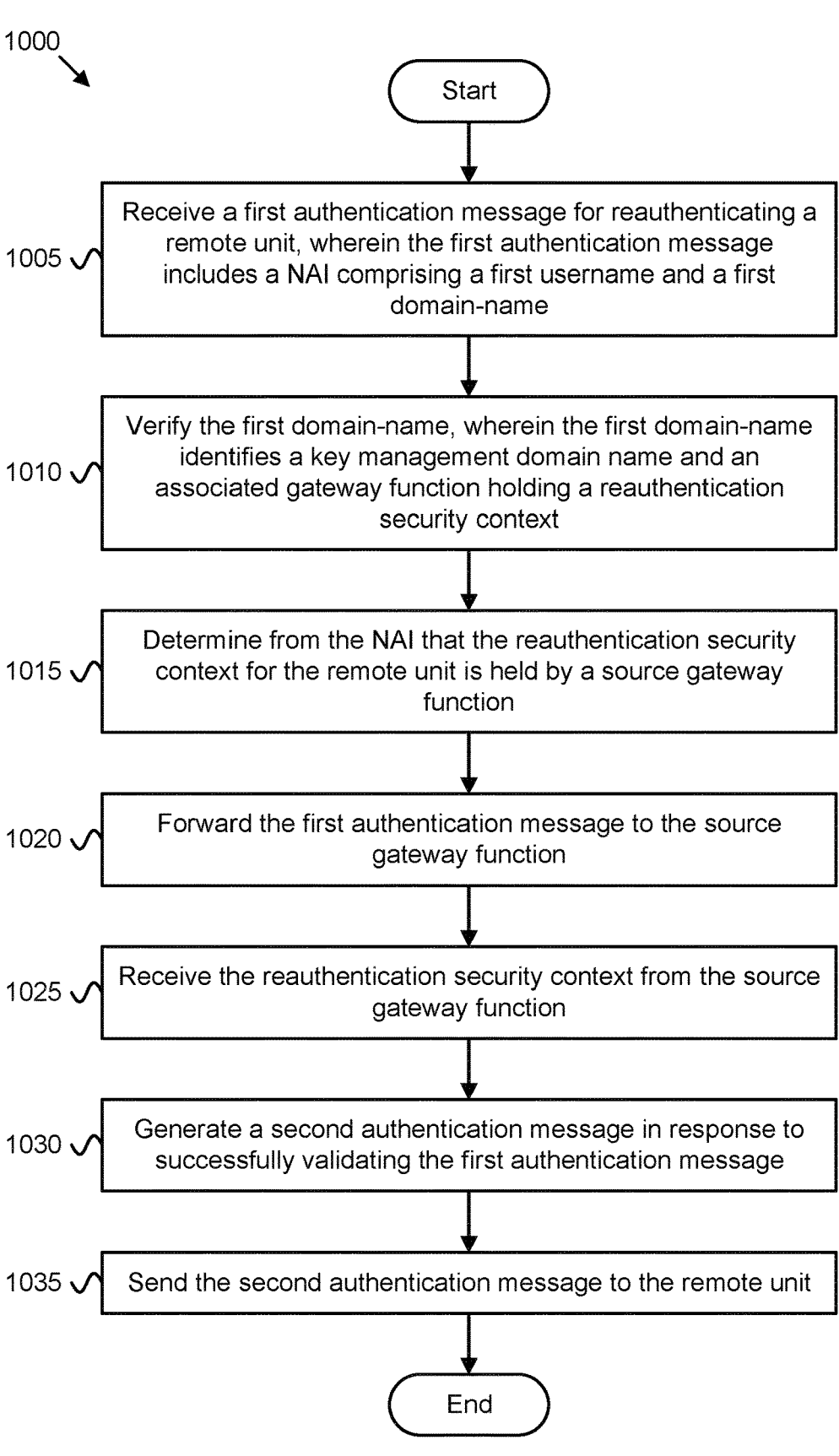

Start

1005 — Receive a first authentication message for reauthenticating a remote unit, wherein the first authentication message includes a NAI comprising a first username and a first domain-name 1010 — Verify the first domain-name, wherein the first domain-name identifies a key management domain name and an associated gateway function holding a reauthentication security context 1015 — Determine from the NAI that the reauthentication security context for the remote unit is held by a source gateway function 1020 — Forward the first authentication message to the source gateway function 1025 — Receive the reauthentication security context from the source gateway function 1030 — Generate a second authentication message in response to successfully validating the first authentication message 1035 — Send the second authentication message to the remote unit End

FIG. 10

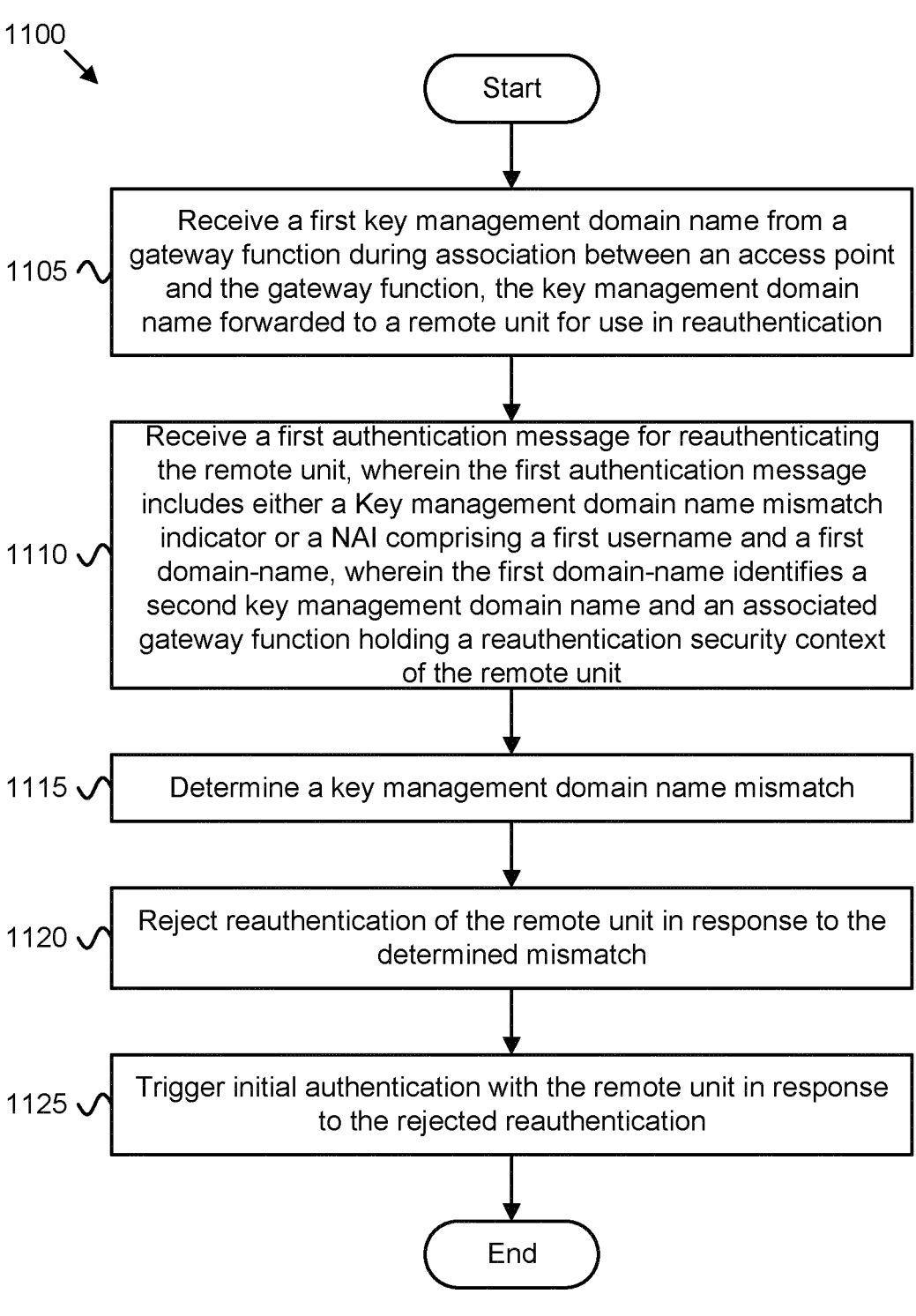

1100

Start

1105 Receive a first key management domain name from a gateway function during association between an access point and the gateway function, the key management domain name forwarded to a remote unit for use in reauthentication 1110 Receive a first authentication message for reauthenticating the remote unit, wherein the first authentication message includes either a Key management domain name mismatch indicator or a NAI comprising a first username and a first domain-name, wherein the first domain-name identifies a second key management domain name and an associated gateway function holding a reauthentication security context of the remote unit 1115 Determine a key management domain name mismatch 1120 Reject reauthentication of the remote unit in response to the determined mismatch 1125 Trigger initial authentication with the remote unit in response to the rejected reauthentication End

FIG. 11

SUPPORTING REMOTE UNIT REAUTHENTICATION

The subject matter disclosed herein relates generally to supporting reauthentication for a UE with a Trusted Non-3GPP Gateway Function ("TNGF").

BACKGROUND

The following abbreviations and acronyms are herewith defined, at least some of which are referred to within the following description.

Third Generation Partnership Project ("3GPP"), Fifth-Generation Core network ("5GC"), Fifth-Generation Access Network ("5G-AN"), Access and Mobility Management Function ("AMF"), Access Point Name ("APN"), Access Stratum ("AS"), Access Network Information ("ANI"), Application Programing Interface ("API"), Authentication and Key Agreement ("AKA"), Authentication Server Function ("AUSF"), Authentication Token ("AUTN"), Authentication Vector ("AV"), transformed Authentication Vector ("AV'"), Data Network Name ("DNN"), Downlink ("DL"), Enhanced Mobile Broadband ("eMBB"), Evolved Node-B ("eNB"), Evolved Packet Core ("EPC"), Evolved UMTS Terrestrial Radio Access Network ("E-UTRAN"), Extended Master Session Key ("EMSK"), Extensible Authentication Protocol ("EAP"), EAP Reauthentication Protocol ("ERP"), Globally Unique Temporary UE Identity ("GUTI"), Home Network Identifier ("HNID"), Home Subscriber Server ("HSS"), Internet Key Exchange ("IKE"), Internet Key Exchange Version 2 ("IKEv2"), Internet Protocol ("IP"), IP Key Exchange ("IPX"), IP Multimedia Subsystem ("IMS," aka "IP Multimedia Core Network Subsystem"), IP Security ("IPsec", i.e., referring to protocols, algorithms, and key management methods), Inter-PLMN User Plane Security ("IPUPS"), Long Term Evolution ("LTE"), LTE Advanced ("LTE-A"), Master Session Key ("MSK"), Medium Access Control ("MAC"), Mobile Network Operator ("MNO"), Mobility Management Entity ("MME"), Non-Access Stratum ("NAS"), Narrowband ("NB"), Network Function ("NF"), Network Access Identifier ("NAI"), Next Generation (e.g., 5G) Node-B ("gNB"), Next Generation (i.e., Fifth Generation) Radio Access Network ("NG-RAN"), New Radio ("NR"), Policy Control Function ("PCF"), Packet Data Network ("PDN"), Packet Data Unit ("PDU"), PDN Gateway ("PGW"), Public Land Mobile Network ("PLMN"), Quality of Service ("QoS"), Radio Access Network ("RAN"), Radio Access Technology ("RAT"), Radio Resource Control ("RRC"), Receive ("Rx"), Reauthentication Integrity Key ("rIK"), Reauthentication Master Session Key ("rMSK"), Reauthentication Root Key ("rRK"), Security Anchor Function ("SEAF"), Security Mode Control ("SMC"), Single Network Slice Selection Assistance Information ("S-NSSAI"), Serving Gateway ("SGW"), Serving Network Identifier ("SN Id"), Serving Network Name ("SNN"), Sequence Number ("SEQ"), Session Management Function ("SMF"), Subscription Concealed Identity ("SUCI"), Subscription Permanent Identity ("SUPI"), Subscription Identifier De-concealing Function ("SIDF"), Transmission Control Protocol ("TCP"), Transmit ("Tx"), Trusted Non-3GPP Access Network ("TNAN"), Trusted Non-3GPP Access Point ("TNAP"), Trusted Non-3GPP Gateway Function ("TNGF"), Unified Data Management ("UDM"), Unified Data Repository ("UDR"), User Entity/Equipment (Mobile Terminal) ("UE"), Uplink ("UL"), User Plane ("UP"), User Plane Function ("UPF"), Universal Mobile Telecommunications System ("UMTS"), Universal Subscriber Identity Module ("USIM"), User Datagram Protocol ("UDP"), User Location Information ("ULI"), Wireless Local Area Network ("WLAN"), Worldwide Interoperability for Microwave Access ("WiMAX"), and Expected Response ("XRES").

In certain embodiments, a UE may access a 5G core ("5GC") network via a gateway function in a trusted non-3GPP access network ("TNAN").

BRIEF SUMMARY

One method of a UE, e.g., for supporting remote unit reauthentication, includes sending a first authentication message to a network function to authenticate a remote unit with a mobile communication network and receiving a second authentication message from the network function in response to the first authentication message. Here, the first authentication message contains an indicator that the remote unit supports EAP Reauthentication Protocol ("ERP") and the second authentication message contains a key management domain name, the key management domain name indicating a group of network functions that can share reauthentication security context for the apparatus to perform ERP. The method includes deriving reauthentication security context in response to successful authentication with the mobile communication network and locally storing the received key management domain name and the derived reauthentication security context for subsequent reauthentication with the mobile communication network.

One method of a TNGF, e.g., for supporting remote unit reauthentication, includes receiving a first authentication message for reauthenticating a remote unit. Here, the first authentication message includes a NAI containing a first username and a first domain-name, where the first username comprises a key identifier. The method includes verifying the first domain-name and validating the first authentication message using at least the re-authentication Integrity Key (rIK) from the security context identified by the first username. Here, the first domain-name identifies a key management domain name and an associated gateway function holding the reauthentication security context. The method includes generating a second authentication message in response to successfully validating the first authentication message and responding to the first authentication message by sending the second authentication message.

One method of a target TNGF, e.g., for supporting remote unit reauthentication, includes receiving a first authentication message for reauthenticating a remote unit. Here, the first authentication message includes a NAI containing a first username and a first domain-name, where the first username comprises a key identifier. The method includes verifying the first domain-name and determining from the TNGF identification information indicated as part of the first domain-name and first username that the reauthentication security context for the remote unit is held by a source gateway function. Here, the first domain-name identifies a key management domain name and an associated gateway function holding a reauthentication security context. The method includes forwarding the first authentication message to the source gateway function and receiving the reauthentication security context from the source gateway function. The method includes generating a second authentication message in response to receiving the reauthentication security context and sending the second authentication message to the remote unit.

One method of an TNAP, e.g., for supporting remote unit reauthentication, includes receiving a first key management domain name from a gateway function during association between an access point and the gateway function, the key management domain name forwarded to a remote unit for use in reauthentication. The method includes receiving a first authentication message for reauthenticating the remote unit and determining a key management domain name mismatch. Here, the first authentication message includes either a Key management domain name mismatch indicator or a NAI containing a first username and a first domain-name, where the first domain-name identifies a second key management domain name and an associated gateway function holding a reauthentication security context of the remote unit. The method includes rejecting reauthentication of the remote unit in response to the determined mismatch and triggering initial authentication with the remote unit in response to the rejected reauthentication.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 9 is a flow chart diagram illustrating one embodiment of a second method for supporting remote unit reauthentication;

FIG. 10 is a flow chart diagram illustrating one embodiment of a third method for supporting remote unit reauthentication; and FIG. 11 is a flow chart diagram illustrating one embodiment of a fourth method for supporting remote unit reauthentication.

DETAILED DESCRIPTION

Figure 1:
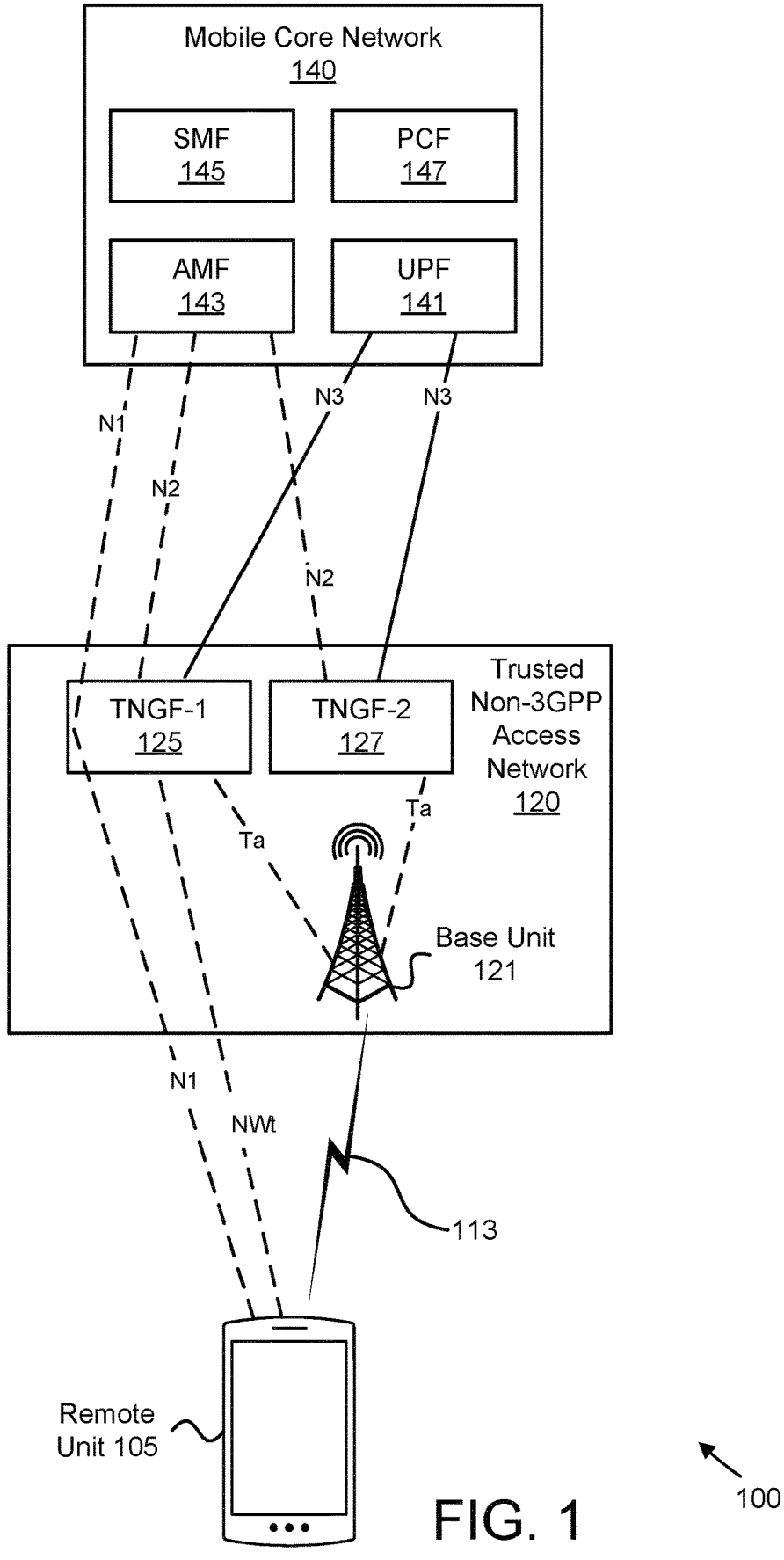
FIG. 1 is a diagram illustrating one embodiment of a wireless communication system for supporting remote unit reauthentication.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

Methods, apparatuses, and systems are disclosed for supporting remote unit reauthentication. A UE may access a 5G core ("5GC") network via a Trusted Non-3GPP Gateway Function ("TNGF") in a trusted non-3GPP access network ("TNAN"). When the UE wants to exchange NAS messages with 5GC via a TNAN, an EAP-5G session is initiated between the UE and a TNGF, and NAS messages are transferred over the EAP-5G session. This enables the UE to perform various 5G NAS procedures via trusted non-3GPP access, such as a registration procedure and a service request procedure.

The EAP Re-authentication Protocol ("ERP") is currently supported in communication networks to re-authenticate the UEs with the local ER Server (based on the previously generated security context) if the UE attempts to reconnect to the same serving/home network. But the ERP currently does not support sharing of re-authentication security context among the ER-Servers if there is a UE mobility between the ER Servers. Therefore, when the UE moves to an area served by a different ER-Server, the UE must perform a full authentication with the core network causing unnecessary delay in the UE attachment time and complexity to the network.

The EAP Extensions for the ERP is specified in IETF RFC 6696. According to RFC 6696, the Extensible Authentication Protocol ("EAP") is an authentication framework that supports multiple authentication methods.

The EAP keying hierarchy defines two keys to be derived by all key-generating EAP methods: the Master Session Key ("MSK") and the Extended MSK ("EMSK"). In the most common deployment scenario, an EAP peer and an EAP server authenticate each other through a third party known as the EAP authenticator. The EAP authenticator or an entity controlled by the EAP authenticator enforces access control. When a peer moves from one authenticator to another, it is desirable to avoid a full EAP authentication to support fast handovers. The full EAP exchange with another run of the EAP method can take several round trips and significant time to complete, causing increased handover times. Key sharing across authenticators is sometimes used as a practical solution to lower handover times. In that case, however, the compromise of one authenticator results in the compromise of key material established via other authenticators.

To achieve low latency handovers, the disclosure specifies EAP Re-authentication Extensions (ERXs) for efficient re-authentication using EAP. The EAP Re-authentication Protocol (ERP) supports re-authentication of a peer that has valid, unexpired key material from a previously performed EAP authentication, independently from the EAP authentication method used.

The ERP uses a rRK (re-authentication Root Key), which is derived by the AUSF (EAP Server) from EMSK and provided to the TNGF by implicit bootstrapping during UE initial authentication. As discussed in further detail below, the rRK is used to derive a rIK (re-authentication Integrity Key) and at least one rMSK (re-authentication Master Session Key). In various embodiments, the ERP Keys are derived during the EAP exchange (i.e. during initial UE full authentication). Further, the ERP exchange for UE re-authentication is carried out between the UE, an EAP Reauthentication Authenticator ("ER Authenticator"), and an EAP Server ("ER Server"), as discussed in FIGS. 3-4 below.

When a UE moves from a source TNAP to a target TNAP within the area of the same TNGF, it does not need to perform a full authentication. Instead, the UE is re-authenticated by the TNGF (ER Server) and a fresh rMSK key is derived by the TNGF and provided to the Target/New TNAP to establish security over the air between UE and the Target TNAP. In the 5G system supporting ERP, the UE performs the role of peer, the TNAP performs the role of ER authenticator, and the TNGF performs the role of ER Server (i.e., Local ER Server). Note that in the 5G system, the AUSF takes the role of the backend authentication server (i.e., EAP Server).

The present disclosure describes solutions that support re-authentication during UE mobility between two TNGFs (ER Servers) and that mitigate security breach due to static rIK leakage by introducing dynamic rIK (also known as fresh rIk) for every ERP run to integrity protect ERP message exchanges. The present disclosure describes solutions that use key management domains to control sharing of UE's re-authentication security context among one or more TNGFs or TNANs, thereby reducing overhead caused by domain specific root re-authentication key (DSRK) which requires EAP Server involvement for reauthentication of UE for its every mobility between the different ER Server domain leading to message exchange overhead.

According to a first solution, the 5G system is enhanced to support re-authentication of UEs using trusted non-3GPP access in the 5G Network. The first solution consists of a first phase, described below with reference to FIGS. 2A-2C, and a second phase, described below with reference to FIGS. 3A-3B and 4A-4C. The first phase is an ERP implicit bootstrapping phase, which happens during the Initial full authentication. The second phase is a reauthentication phase using ERP. Note that the second phase considers two types of UE mobility: A) Intra-TNGF Re-authentication (UE mobility within same TNGF between two TNAPs) and B) Inter-TNGF Re-authentication (UE mobility between two TNGFs). Intra-TNGF reauthentication is described below with reference to FIGS. 3A-3B. Inter-TNGF reauthentication is described below with reference to FIGS. 4A-4C.

FIG. 1 depicts a wireless communication system 100 for supporting remote unit reauthentication, according to embodiments of the disclosure. In one embodiment, the wireless communication system 100 includes at least one remote unit 105, at least one trusted non-3GPP access network ("TNAN") 120, and a mobile core network 140 in a PLMN. The TNAN 120 may be composed of at least one base unit 121. The remote unit 105 may communicate with the TNAN 120 using non-3GPP communication links 113, according to a radio access technology deployed by TNAN 120. Even though a specific number of remote units 105, base units 121, TNANs 120, and mobile core networks 140 are depicted in FIG. 1, one of skill in the art will recognize that any number of remote units 105, base units 121, TNANs 120, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE/EPC (referred as '4G') or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 121 in the TNAN 120 via uplink ("UL") and downlink ("DL") communication signals. Furthermore, the UL and DL communication signals may be carried over the communication links 113. Note, that the TNAN 120 is an intermediate network that provide the remote units 105 with access to the mobile core network 140.

The base units 121 may serve a number of remote units 105 within a serving area, for example, a cell or a cell sector, via a communication link 113. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the communication links 113. The communication links 113 may be any suitable carrier in licensed or unlicensed radio spectrum. The communication links 113 facilitate communication between one or more of the remote units 105 and/or one or more of the base units 121.

As noted above, the TNAN 120 supports secure signaling interfaces and interworking with the 5G core network. The TNAN includes at least one TNGF; in the depicted embodiment the TNAN 120 includes a first TNGF ("TNGF-1") 125 and a second TNGF ("TNGF-2") 127. In certain embodiments, the TNAN 120 supports a Tn interface between the TGNF in the TNAN 120.

The base units 121 may be distributed over a geographic region. In certain embodiments, a base unit 121 may also be referred to as a Trusted Non-3GPP Access Point ("TNAP"), an access terminal, an access point, a base, a base station, a relay node, a device, or by any other terminology used in the art. The base units 121 are generally part of a radio access network ("RAN"), such as the TNAN 120, that may include one or more controllers communicably coupled to one or more corresponding base units 121. These and other elements of radio access network are not illustrated but are well known generally by those having ordinary skill in the art. The base units 121 connect to the mobile core network 140 via the TNAN 120.

In some embodiments, the remote units 105 communicate with an application server (or other communication peer) via a network connection with the mobile core network 140. For example, an application in a remote unit 105 (e.g., web browser, media client, telephone/VoIP application) may trigger the remote unit 105 to establish a PDU session (or other data connection) with the mobile core network 140 using the TNAN 120. In order to establish the PDU session, the remote unit 105 must be registered with the mobile core network.

In one embodiment, the mobile core network 140 is a 5G core ("5GC") or the evolved packet core ("EPC"), which may be coupled to a data network (such as the Internet and private data networks, among other data networks). A remote unit 105 may have a subscription or other account with the mobile core network 140. The present disclosure is not intended to be limited to the implementation of any particular wireless communication system architecture or protocol.

The mobile core network 140 includes several network functions ("NFs"). As depicted, the mobile core network 140 includes at least one user plane function ("UPF") 141. The mobile core network 140 also includes multiple control plane functions including, but not limited to, an Access and Mobility Management Function ("AMF") 143, a Session Management Function ("SMF") 145, and a Policy Control Function ("PCF") 147. In certain embodiments, the mobile core network 140 may also include a Unified Data Management function ("UDM") 149, an Authentication Server Function ("AUSF"), a Network Repository Function ("NRF") (used by the various NFs to discover and communicate with each other over APIs), or other NFs defined for the 5G Core.

In various embodiments, the mobile core network 140 supports different types of mobile data connections and different types of network slices, wherein each mobile data connection utilizes a specific network slice. Each network slice includes a set of CP and UP network functions, wherein each network slice is optimized for a specific type of service or traffic class. The different network slices are not shown in FIG. 1 for ease of illustration, but their support is assumed. In one example, each network slice includes an SMF and a UPF, but the various network slices share the AMF 143, the PCF 147, and the UDM. In another example, each network slice includes an AMF, an SMF and a UPF. Although specific numbers and types of network functions are depicted in FIG. 1, one of skill in the art will recognize that any number and type of network functions may be included in the mobile core network 140.

In various embodiments, the remote unit 105 sends an ERP support indicator when registering/authentication with the mobile core network 140 via the TNAN 120. Because the remote unit 105 supports ERP, the TNGF-1 125 performs ERP bootstrapping during the initial authentication as described below with reference to FIGS. 2A-2C. Thereafter, as the mobility of the remote unit 105 causes it to connect to a new base unit 121 in the TNAN 120, the remote unit reauthenticates using ERP as described below with reference to FIGS. 3A-3B and 4A-4C. Should the remote unit 105 leave a key-management domain (i.e., an area where the security keys can be shared with different TNGFs), then initial authentication will again be performed as described below with reference to FIG. 5.

Figure 2A:
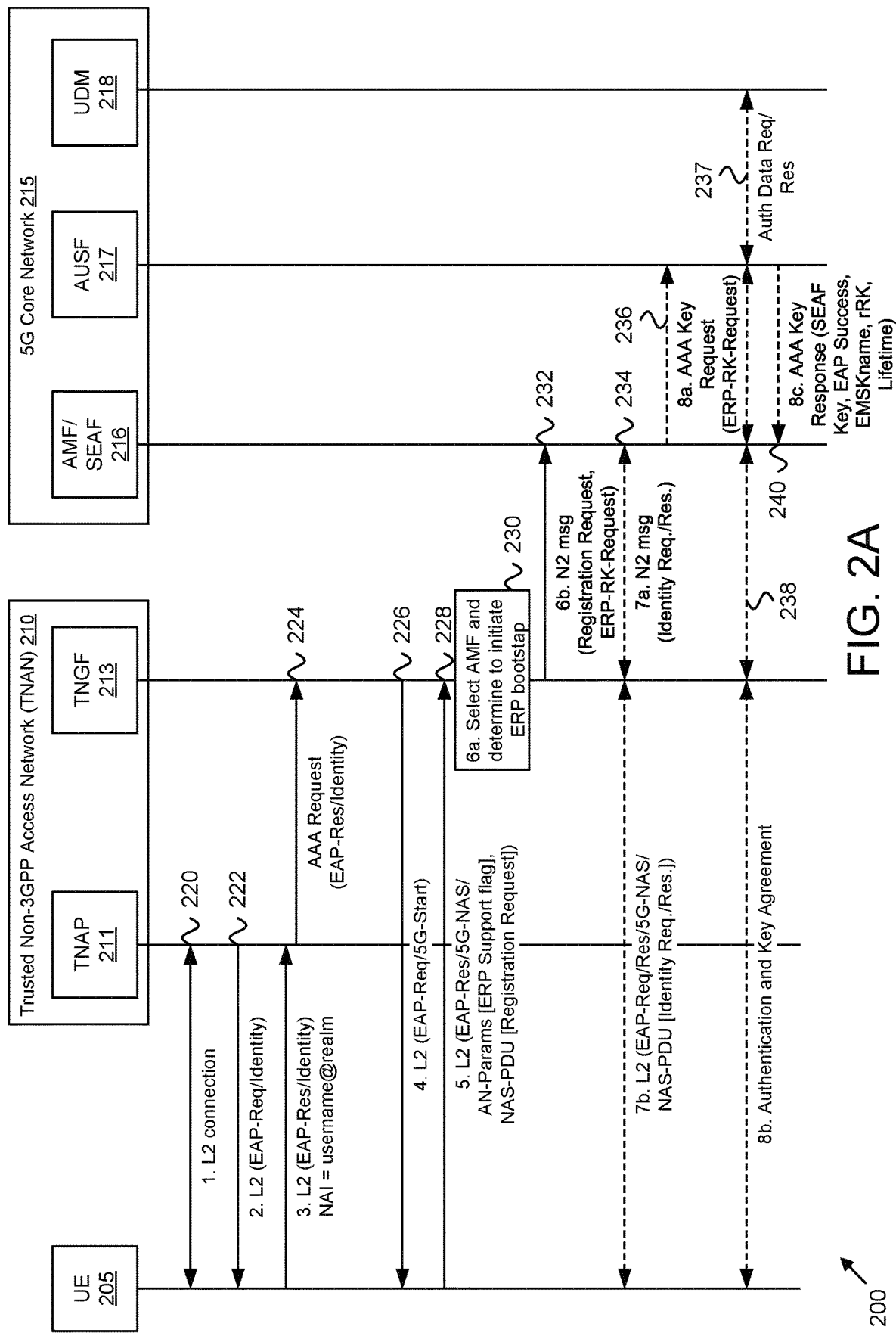
FIG. 2A is a signal flow diagram illustrating one embodiment of a 5G registration procedure over a trusted non-3GPP access network.
Figure 2B:
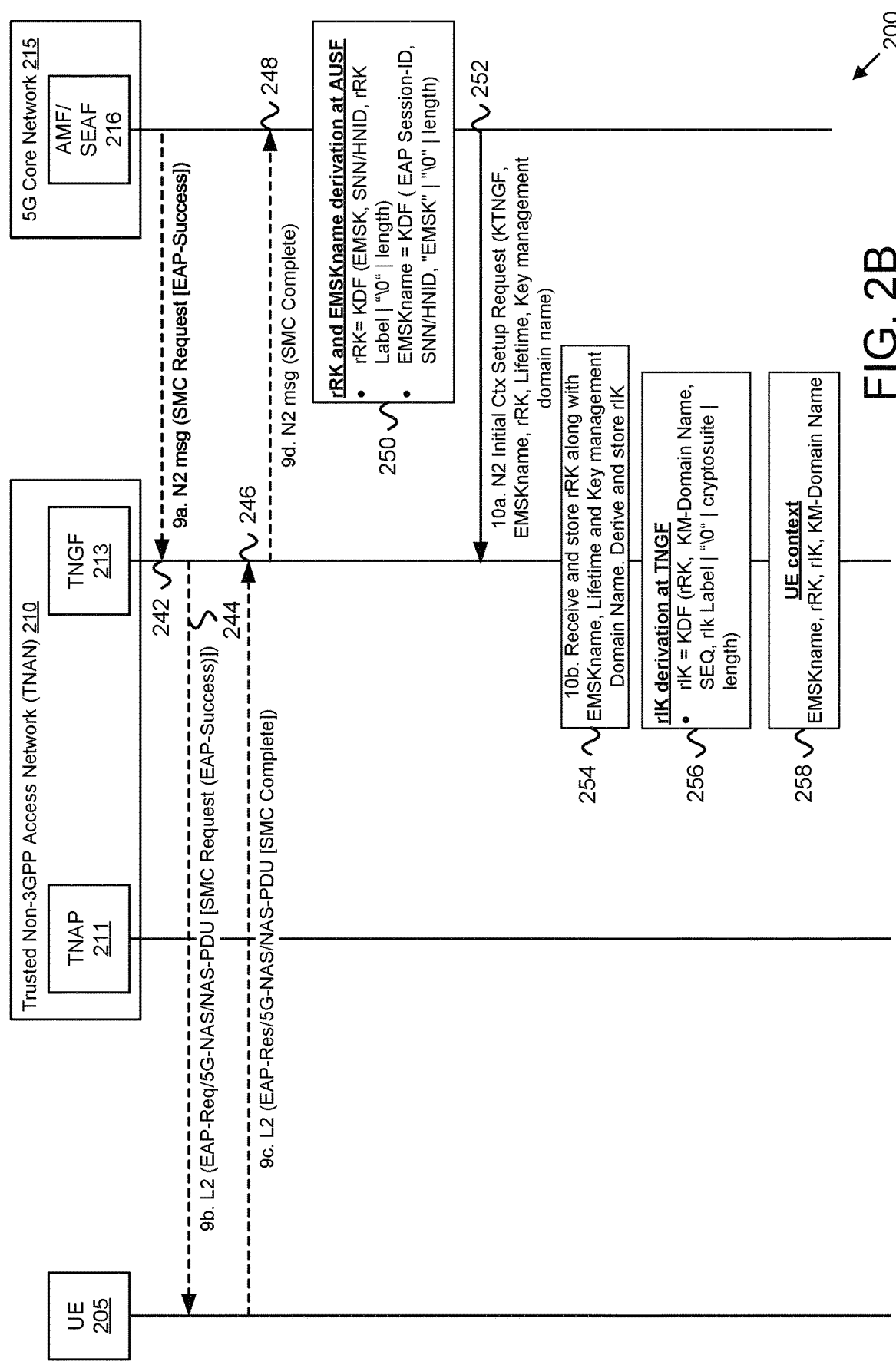
FIG. 2B is a continuation of the procedure depicted in FIG. 2A.
Figure 2C:
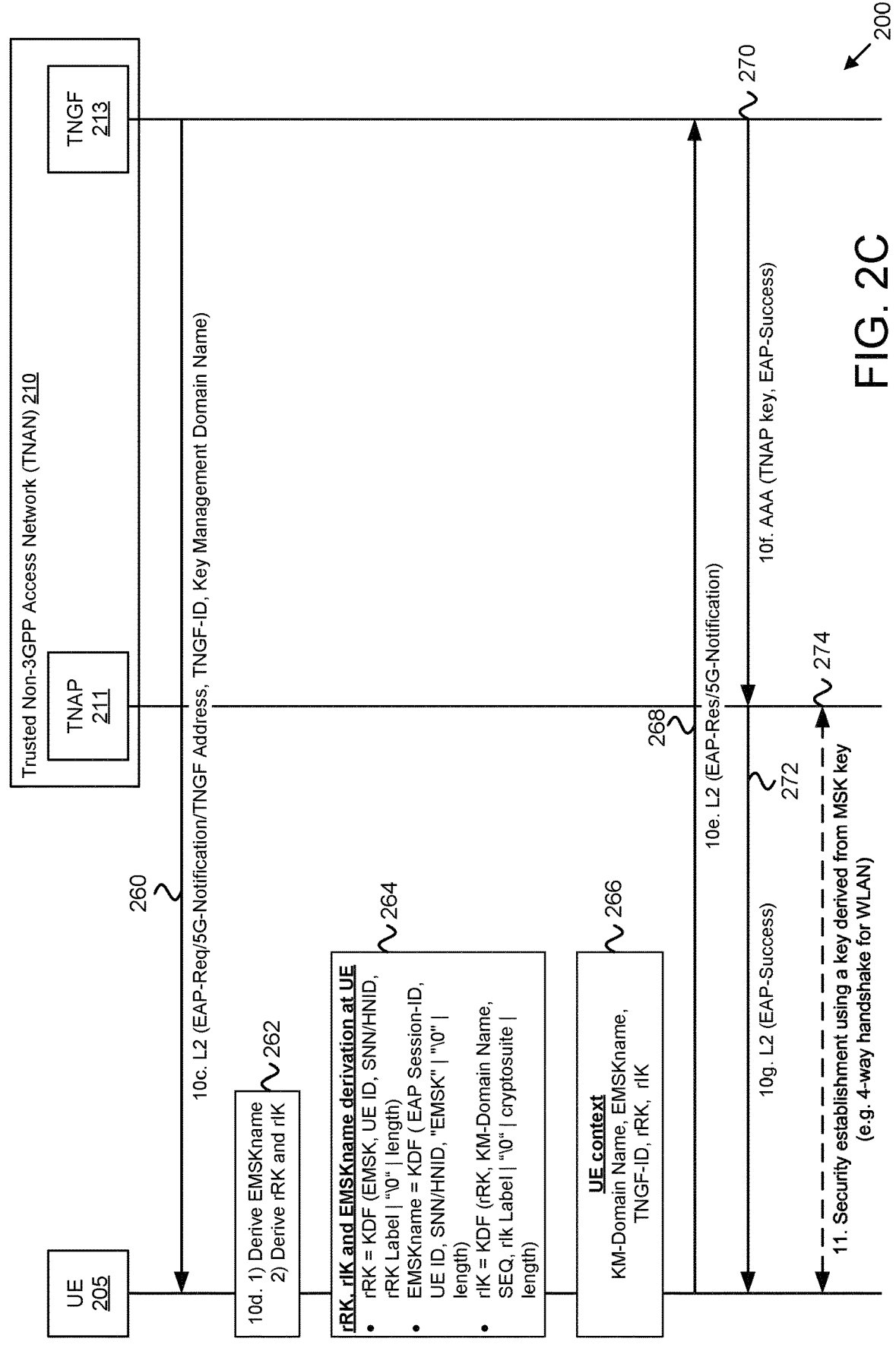
FIG. 2C is a continuation of the procedure depicted in FIG. 2B.

FIGS. 2A-2C depict a procedure 200 for UE registration and authentication for a trusted non-3GPP access network, according to embodiments of the disclosure. The procedure 200 involves the UE 205 (e.g., one embodiment of the remote unit 105), a TNAN 210 (e.g., one embodiment of the TNAN 120) comprising a TNAP 211 and a TNGF 213 (e.g., one embodiment of the TNGF 123), and a 5G core network 215 (e.g., one embodiment of the mobile core network 140). In the most typical case, the trusted non-3GPP access network 210 is a WLAN access network complying with the IEEE 802.11 specification.

The procedure 200 begins at FIG. 2A, in Step 1 the UE 205 selects a PLMN and a TNAN 210 for connecting to this PLMN by using the Trusted Non-3GPP Access Network selection procedure currently specified in TS 23.501, clause 6.3.12. During this procedure, the UE 205 discovers the PLMNs with which the TNAN 210 supports trusted connectivity (e.g. "5G connectivity"). A layer-2 ("L2") connection (see connection 220) is established between the UE 205 and the TNAP 210. In the case of IEEE 802.11, this step corresponds to an 802.11 Association. In the case of PPP, this step corresponds to a PPP LCP negotiation. In other types of non-3GPP access (e.g., Ethernet), this step may not be required.

At Steps 2-3, an EAP authentication procedure is initiated. EAP messages (see messaging 222, 224) may be encapsulated into layer-2 packets, e.g., into IEEE 802.3/802.1x packets, into IEEE 802.11/802.1x packets, into PPP packets, or the like. The UE 205 provides an NAI that triggers the TNAP 211 to send a AAA request to a TNGF 213. Note that an AAA interface exists between the TNAP 211 and TNGF 213. Between the TNAP 211 and TNGF 213, the EAP packets are encapsulated into AAA messages.

As Step 4, the UE 205 receives an L2 EAP-Req/5G-Start message from the TNGF 213 (see messaging 226). At Step 5, the UE 205 responds with an L2 message to the TNGF 213 (see messaging 228). The L2 message encapsulates an EAP-5G Response message (EAP-Res/5G-NAS) containing AN parameters (AN-Params) and a NAS registration request (NAS-PDU [Registration Request]). If the UE 205 supports ERP, the L2 message includes the 'ERP Support Flag' as part of the AN Parameters in the AN message or as an individual information element in the AN message that is sent along with the L2 message to the TNGF 213.

The UE 205 includes the 'ERP Support Flag' to indicate to the TNGF 213, acting as an ER Server, that the UE 205 supports ERP. In such an embodiment, the TNGF 213 can determine based on the received 'ERP Support Flag' and initiate implicit ERP bootstrapping along with the EAP authentication messages to fetch the re-authentication security context for subsequent re-authentication of the UE 205. The usage of the 'ERP Support flag' prevents unnecessary ERP implicit bootstrapping initiation at the TNGF 213 and saves network resources if the UE 205 does not support ERP.

In the absence of the 'ERP Support Flag' indication from the UE 205, if the TNGF 213 supports ERP and expects to support re-authentication using ERP, then without knowing whether the UE 205 is capable of ERP support, the TNGF 213 initiates an implicit ERP bootstrapping with the core network to receive the re-authentication security context from the EAP Server (AUSF 217) in the 5GC 215. If the UE 205 does not support ERP, EAP-Initiate/Re-auth-Start messages that are sent to the UE 205 by the authenticator (TNAP 211) will be silently dropped by the UE 205 causing further waste of resources.

At step 6a, the TNGF 213 selects an AMF, i.e., the AMF/SEAF 216 in the 5GC 215, and determines to initiate ERP bootstrapping (see block 230). At step 6b, the TNGF 213 sends a N2 message to the AMF/SEAF 216 (see messaging 232). If an 'ERP Support Flag' is received from the UE 205 and if the TNGF 213 supports ERP, then the TNGF 213 includes the 'ERP Key Request' in the N2 message to initiate implicit bootstrapping and forwards the registration request received from the UE 205 to the AMF/ SEAF 216. Alternatively, if a 'ERP Support Flag' is not received at the TNGF 213 from the UE 205 or if the TNGF 213 does not support ERP, in either case, the TNGF 213 does not include the 'ERP Key Request' in the N2 message and does not perform ERP implicit bootstrapping.

At step 7, the UE 205 and AMF/SEAF 216 in the 5GC 215 exchange additional NAS messages over the EAP-5G session (see messaging 234). Examples of the additional NAS messages include, but are not limited to, those involved with NAS authentication of the UE 205.

At step 8a, the AMF 216 in the 5GC 215 sends the received 'ERP Key Request' along with the AAA key request in AAA interface/authentication request in a service-based interface ("SBI") to the AUSF 217 in the 5GC 215 (see messaging 236). At optional step 8b, additional EAP message exchanges, if required, are performed between the UE 205 and the AUSF 217 in the 5GC 215 (see messaging 238). The AUSF 217 in the 5GC 215 further sends (see messaging 237) the authentication data request to the UDM 218 in the 5GC 215 and receives an authentication vector (i.e., EAP-AKA' AV), authentication method indication, and SUPI from the UDM 218 in the 5GC 215. The EAP-AKA' AV is composed of RAND, AUTN, XRES, CK', and IK'.

In response to receiving an 'ERP Key Request' from the AMF/SEAF 216 in the 5GC 215, then the AUSF 217 in the 5GC 215 generates a re-authentication security context that includes deriving an rRK, an EMSKname, and an rRK Lifetime. As it relates to the subject matter disclosed herein, the rRK is used as the re-authentication root key and the EMSKname (a Keyname) is used as key identifier for the rRK. The rRK lifetime is assigned by the AUSF 217 in the 5GC 215 and defines the validity or lifetime of the rRK key. On expiry of the rRK lifetime, the TNGF 213 of the TNAN 210, acting as the ER Server, attempts to perform a full authentication.

The rRK is derived using a key derivation function ("KDF") (see block 250). In a first option, the EMSK, SUPI, and Serving Network Name/Home network ID ("SNN/ HNID") are used as parameters for the KDF. For instance, the rRK may be derived using a Key Derivation Function ("KDF," i.e., a cryptographic hash function) and the following formula:

$$rRK=KDF(EMSK,SUPI,SNN/HNID|rRK\ Label|`\backslash0`|length) \qquad \text{Equation 1}$$

As used herein, the parameter "rRK Label" refers to a string (e.g., 8-bit ASCII string). The rRK Label may be preassigned by an authority, such as a standards organization. The length field refers to the length (e.g., in octets) of the derived key (i.e., the rRK in Equation 1). In various embodiments, the length field may be encoded as specified in IETF RFC 5295. Note that the (EMSK), the (SUPI), and the (SNN/HNID|rRK Label|`\0`|length) are three inputs to the KDF, where the '|' operator indicates concatenation. Here, the value '\0' may be used to show separation between various inputs and length.

In a second option, the $K_{AUSF}$, SUPI, SNN/HNID are used as parameters for the KDF. For instance, the rRK may be derived using a Key Derivation Function and the following formula:

$$rRK=KDF(K_{AUSF}),(SUPI),SNN/HNID|rRK\ Label|`\backslash0`|length) \qquad \text{Equation 2}$$

Note that the ($K_{AUSF}$), the (SUPI), and the (SNN/ HNID|rRK Label|`\0`|length) are three inputs to the KDF, where the '|' operator indicates concatenation. Here, the value '\0' may be used to show separation between various inputs and length. The length field refers to the length (e.g., in octets) of the derived key (i.e., the rRK in Equation 2).

In either implementation, the home network ID ("HNID") may include the MCC and MNC of the IMSI/NAI. SNN is the serving network name which contains the serving network Identifier ("SNID") and the 5G code. Further, if the rRK is generated from the EMSK, then the derivation of the corresponding key identifier, EMS Kname (see block 250), is performed using a KDF with EAP Session-ID, SUPI, SNN/HNID, and EMSK being used as parameters, e.g., derived using the following formula:

$$EMSKname=KDF(EAP\ Session-ID,SUPI,SNN/HNID,"EMSK"|`\backslash0`|length) \qquad \text{Equation 3}$$

Note that the (EAP Session-ID), the (SUPI), the (SNN/ HNID) and the (EMSK|rRK Label|`\0`\ length) are four inputs to the KDF, where the '|' operator indicates concatenation. Here, the value '\' may be used to show separation between various inputs and length. The length field refers to the length (e.g., in octets) of the derived parameter (i.e., the EMSKname in Equation 3).

If rRK is derived from $K_{AUSF}$, then a corresponding key identifier, Kausfname, can be derived using a KDF with EAP Session-ID, SUPI, SNN/HNID, and "K_AUSF" being used as parameters, e.g., derived using the following formula:

$$Kausfname=KDF(EAP\ Session-ID,SUPI,SNN/HNID,"K\_AUSF"|`\backslash0`|length) \qquad \text{Equation 4}$$

Subsequent re-authentication procedures can use the Keyname Kausfname instead of the Keyname EMSKname, accordingly. Note that the (EAP Session-ID), the (SUPI), the (SNN/HNID) and the ($K_{AUSF}$|rRK Label|`\0`|length) are four inputs to the KDF, where the '|' operator indicates concatenation. Here, the value '\0' may be used to show separation between various inputs and length. The length field refers to the length (e.g., in octets) of the derived parameter (i.e., the Kausfname in Equation 4).

The AUSF 217 in the 5GC 215 provides (see messaging 240) the freshly generated re-authentication security context (comprised of rRK, EMSKname or Kausfname, and rRK Lifetime) along with a SEAF Key and an EAP Success flag in the AAA Key Response message to the SEAF in the 5GC 215, shown here collocated with the AMF in the 5GC 215. The SEAF 216 in the 5GC 215 forwards the re-authentication security context to the AMF 216 in the 5GC 215 along with AMF key (derived from the SEAF Key) and a Key management domain name based on local policy for the re-authentication security context. The AMF 216 in the 5GC 215 locally stores the re-authentication security context until a successful NAS security mode command (e.g., NAS SMC) procedure is performed with the UE 205.

At step 9, the UE 205 and AMF 216 in the 5GC 215 exchange additional NAS messages over the EAP-5G session (see messaging 242-248, FIG. 2B). Examples of the additional NAS messages include, but are not limited to, those involved with NAS authentication or reauthentication. At step 10, a security key 'K$_{TNGF}$' is created in the UE 205 and in the AMF 216 in the 5GC 215 after the successful authentication. The K$_{TNGF}$ is transferred from the AMF 216 in the 5GC 215 to TNGF 213 in the TNAN 210 in step 10a (within the N2 Initial Context Setup Request see messaging 252).

Additionally, after a successful UE authentication and NAS SMC, the AMF 216 in the 5GC 215 sends (see messaging 252) the re-authentication security context (e.g., rRK, EMSKname, rRK Lifetime) along with the corresponding Key Management Domain Name and K$_{TNGF}$ in the N2 Initial Context Setup Request message. Note that the TNGF 213 may be already pre-configured with the Key Management Domain Name, in which case the N2 Initial Context Setup Request message may exclude the Key Management Domain Name.

At step 10b, the TNGF 213 in the TNAN 210 locally stores (see block 254) the received re-authentication security context (e.g., rRK, EMSKname, rRK Lifetime) and Key Management Domain Name (if provided by the AMF/SEAF as no pre-configuration possible at the TNGF). Alternatively, based on the TNGF's association with the TNAP 211 in the TNAN 210, the TNGF 213 may be pre-provisioned/pre-configured with a Key Management Domain Name ("KM-Domain Name") either by the operator or by other means which are outside the scope of this disclosure.

The KM-Domain Name, as used herein, indicates a group of TNGFs 213 and TNAPs 211 in the TNAN 210 that can share the same re-authentication security context to perform ERP based re-authentication of a UE 205 that is accessing the 5G core network service 215 via the specified group of TNGFs 213 in the TNAN 210. The KM-Domain name remains the same for all TNGFs 213 in the TNAN 210 that share the same re-authentication security context. The bootstrapping procedure illustrated in FIGS. 2A-2C plays a main role in controlling the sharing of the UE's re-authentication security context among TNGFs 213 in the TNAN 210 belonging to the same key management domain to ensure the security level of the UE 205 re-authentication security context.

After receiving the TNGF key from AMF 216 in the 5GC 215 in step 10a, the TNGF 213 in the TNAN 210 sends (see messaging 260, FIG. 2C) an EAP-Request/5G-Notification packet containing the "TNGF Contact Info" to the UE 205, which includes the IP address of TNGF 213, the TNGF-ID, and the KM Domain Name.

The TNGF 213 derives (see block 256) a dynamic re-authentication integrity key ("rIK"), for securely exchanging and verifying ERP messages, using a KDF with the rRK, KM-Domain Name, Sequence Number (SEQ) (initialized to '0' or '1' during EAP full authentication and incremented for every ERP run related usage) and an rIK label as parameters—e.g., derived using the following formula:

$$rIK=KDF(rRK,KM\text{-}Domain\ Name,SEQ,rIK\ Label|`\backslash 0'|cryptosuite|length) \qquad \text{Equation 5}$$

Note that the (rRK), the (KM-Domain Name), the (SEQ) and the (rIK Label|'\0'|cryptosuite|length) are four inputs to the KDF, where the '|' operator indicates concatenation. As used herein, the parameter "rIK Label" refers to a string (e.g., 8-bit ASCII string). Here, the value '\0' may be used to show separation between various inputs and length. The length field refers to the length (e.g., in octets) of the derived key (i.e., the rIK in Equation 5).

The TNGF 213 in the TNAN 210 locally stores to UE context the received re-authentication security context (e.g., rRK, EMSKname, Lifetime and Key management domain) along with the rIK if derived (see block 258).

The UE 205, either now or after receiving EAP Success in Step 10f, derives the re-authentication security context, e.g., EMSKname, rRK, and dynamic re-authentication integrity key ("rIK") (see blocks 262, 264), for securely exchanging and verifying ERP messages, using a KDF with the rRK, KM-Domain Name, and an rIK label as parameters—e.g., derived using the Equation 5, similar to the TNGF 213 of the TNAN 210.

The UE 205 locally stores the received TNGF ID, TNGF IP Address and KM-Domain Name to support subsequent re-authentication (see block 266). The TNAP 211 in the TNAN 210 is a trusted entity. The TNGF 213 in the TNAN 210 generates the K$_{TNAP}$ as currently specified in Annex A.22 and transfers it from the TNGF 213 to the TNAP 211 in step 10c (e.g., within a AAA message), along with the KM-Domain Name.

The UE 205 sends (see messaging 268) the EAP-Res/5G-Notification message to the TNGF 213 in the TNAN 210. After receiving the EAP-Response/5G-Notification packet from the UE 205, the TNGF 213 in the TNAN 210 sends (see messaging 270) the message containing the EAP-Success packet along with the TNAP key to the TNAP 211 in the TNAN 210. The TNAP 211 forwards (see messaging 272) the packet containing the EAP-Success in an L2 message to the UE 205.

In Step 11, the UE 205 and the TNAP 211 in the TNAN 210 uses the common TNAP key to derive security keys according to the applied non-3GPP technology and to establish a security association to protect subsequent traffic. In case of IEEE 802.11, for example, the K$_{TNAP}$ is the Pairwise Master Key ("PMK") and a 4-way handshake is executed (see IEEE 802.11) to establish a security context between the TNAP 211 (e.g., WLAN AP) in the TNAN 210 and the UE 205 that is used to protect unicast and multicast traffic over the air. Messages between the UE 205 and the TNAP 211 in the TNAN 210 are encrypted and integrity protected from this step onwards.

Figure 3A:
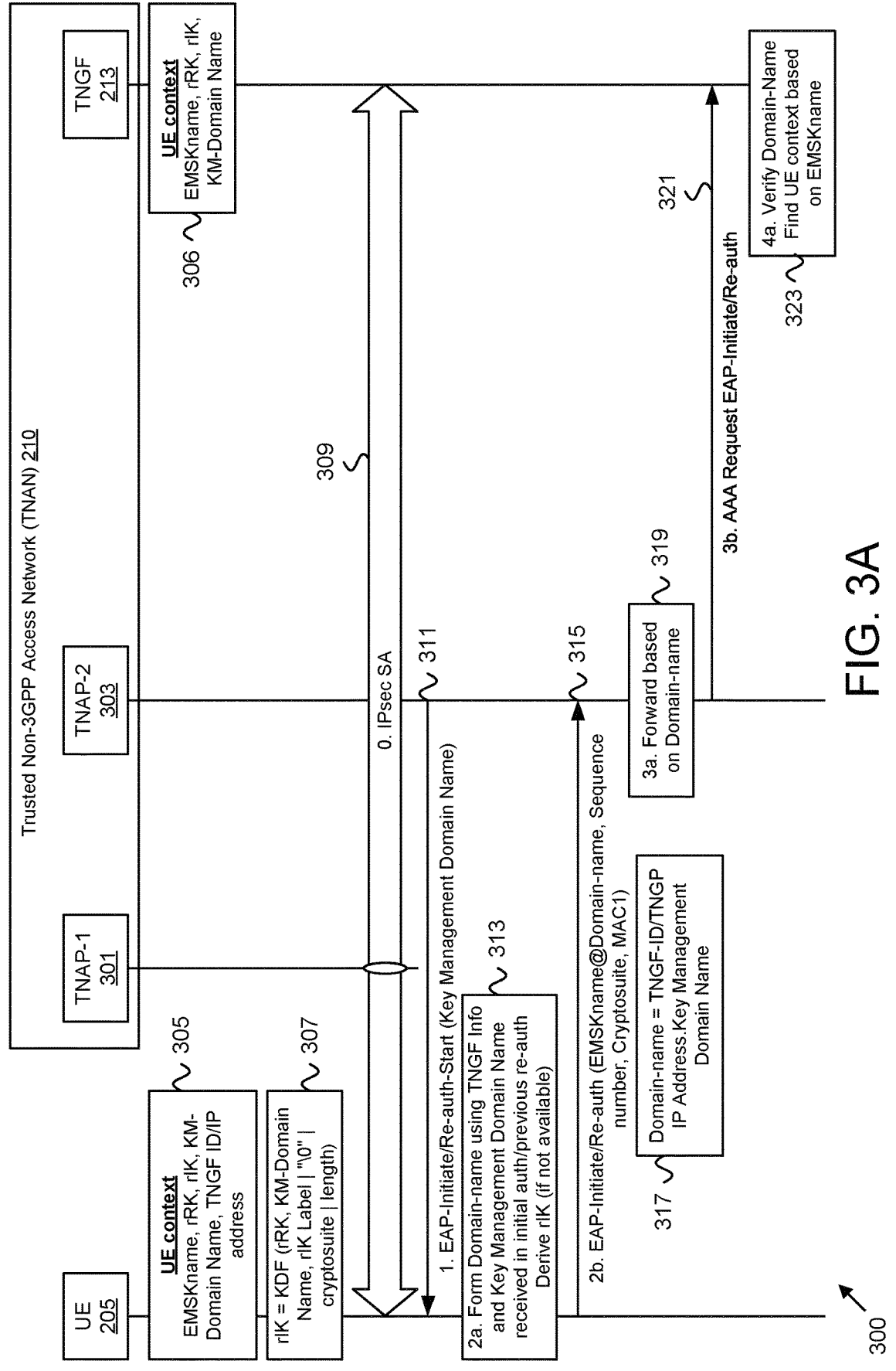
FIG. 3A is a signal flow diagram illustrating one embodiment of a first solution for remote unit reauthentication.
Figure 3B:
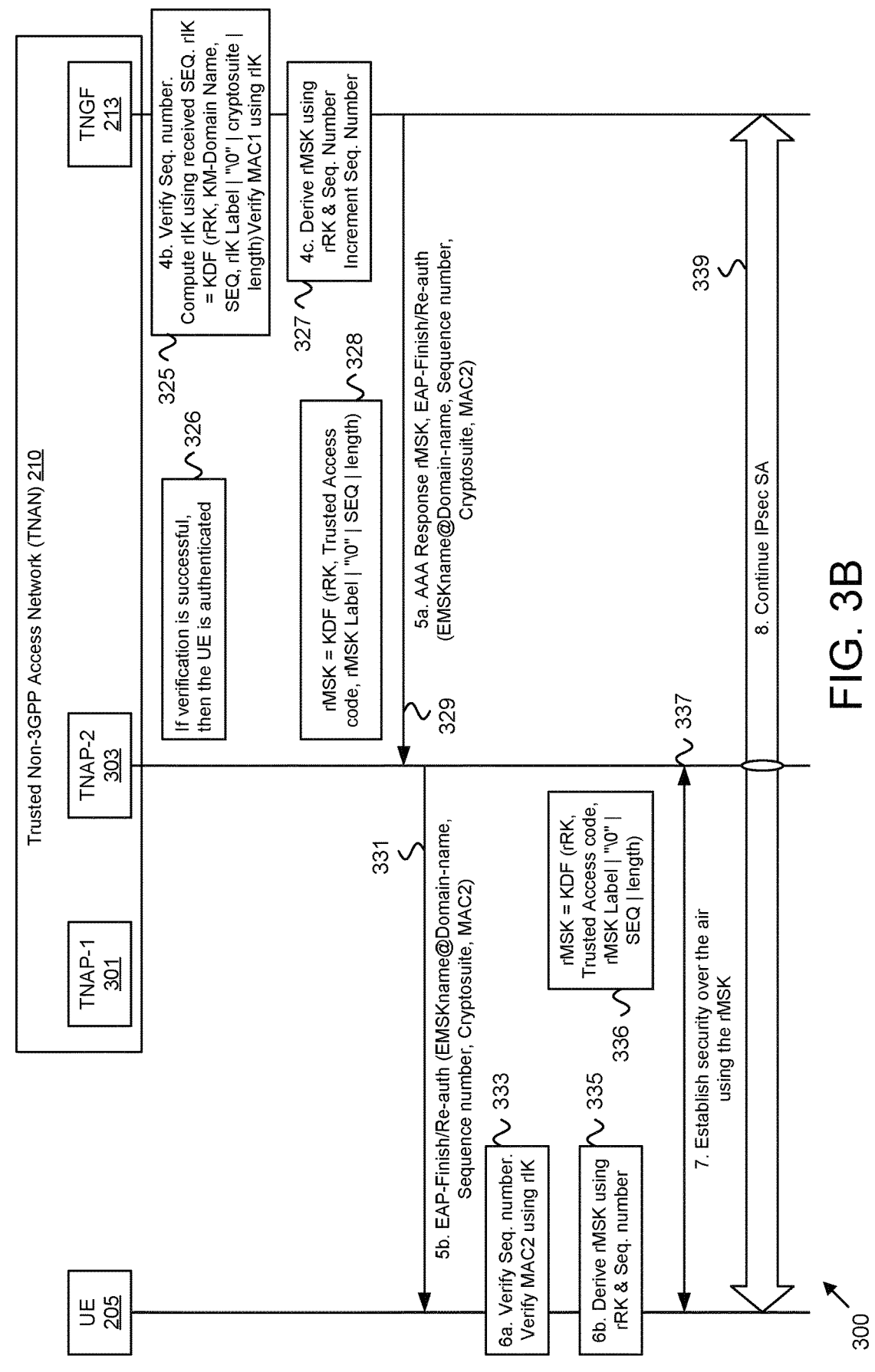
FIG. 3B is a continuation of the procedure depicted in FIG. 3A.

FIGS. 3A-3B depict a procedure for a 5G reauthentication over a trusted non-3GPP access network, according to embodiments of the disclosure. The procedure 300 involves the UE 205 (e.g., one embodiment of the remote unit 105), a first/current TNAP 301, a second/new/target TNAP 303, and a TNGF 213 in the TNAN 210.

Intra-TNGF Mobility, as used herein, is defined as the mobility of a UE 205 between two TNAPs 301, 303 connected to a single/same TNGF 213 in a TNAN 210. As the UE 205 might have been previously authenticated with the TNAN 210 via the same TNGF 213 and the TNGF 213 possesses the re-authentication security context, as derived during ERP implicit bootstrapping as described above with reference to the procedure 200 illustrated in FIGS. 2A-2C, an ERP based re-authentication will be sufficient for the network to provide access to the UE 205 without performing a full authentication again, thereby avoiding multiple different interactions with the 5GC core network 215 and reducing handover latency. In this manner, the procedure 300 described below and illustrated in FIGS. 3A-3B provides for re-authentication that reduces conventional re-authentication complexity in a TNAN 210.

As shown in FIG. 3A, in step 0, an IPsec security association ("SA") connection (see connection 309) is established between the UE 205, the current TNAP 301, the new/target TNAP 303, and the TNGF 213 in the TNAN 210.

In step 1, ERP exchange is triggered by the new/target TNAP 303 (e.g., ER Authenticator) by sending an EAP-5G Start message (see EAP-Initiate/Re-auth-Start message 311) with the Key Management Domain Name ("KM-Domain Name") to the UE 205.

The UE 205 and the TNGF 213 may both have locally stored instances of the UE context (i.e., re-authentication security context), including the EMSKname, rRK, rIK, KM-Domain Name, and TNGF ID/IP address (see block 305 for the UE 205 and block 306 for the TNGF 213). Accordingly, in step 2, the UE 205 verifies the locally stored KM-Domain Name and the one received from the new/target TNAP 303 are the same. If so, then the UE 205 forms the Keyname-NAI as EMSKname@Domain-name (see block 313) and sends (see messaging 315) an EAP-Initiate/Re-auth message to the new/target TNAP 303 (e.g., ER Authenticator). As used herein, a "Keyname-NAI" refers to an NAI (i.e., having the form "username@realm") where the username portion is a key identifier (i.e., Keyname) pointing to a security key (e.g., the EMSKname which points to the EMSK). Note that in alternative embodiments, the Keyname-NAI may have the form Kausfname@Domain-name, instead of EMSKname@Domain-name, as discussed above.

The Domain-name used in the realm of Keyname-NAI (i.e., Keyname-NAI=Keyname@Domain-name) is generated by the UE 205 using the values for TNGF Info and KM-Domain Name as follows: TNGF-ID.KM-Domain Name (see block 317). If the UE 205 contains a previously derived rIK (derived as explained above and shown in block 307) related to the KM-Domain Name, it uses the rIK to integrity protect the ERP exchanges between the UE 205 and the TNGF 213 (e.g., ER Server).

If the UE 205 does not have a locally stored instance of a previously derived rIK, then a static or a fresh rIK (if the UE determines to derive fresh rIK) can be derived by the UE 205. A static rIK, e.g., an rIK that does not change for every ERP run, may be derived using as KDF with the following formula:

$$rIK=KDF(rRK,KM\text{-}Domain\ Name,rIK\ Label|`\backslash 0`|cryptosuite|length) \qquad \text{Equation 6}$$

Note that the (rRK), the (KM-Domain Name), and the (rIK Label|'\0'|cryptosuite|length) are three inputs to the KDF, where the '|' operator indicates concatenation. Here, the value '\0' may be used to show separation between various inputs and length. The length field refers to the length (e.g., in octets) of the derived key (i.e., the rIK in Equation 6).

Note that if a static rIK is used, rIK leakage will breach all the subsequent re-authentication security between the same UE and the same or different TNGFs. Therefore, a fresh rIK, e.g., an rIK that is generated for every ERP run, may be derived using a KDF according to Equation 5, above.

Note the use of a sequence number ("SEQ") as a parameter for generating a fresh rIK for every ERP run or when required. The SEQ is incremented after every usage as input to key derivation to ensure freshness of the key. The EAP-Initiate/Re-auth message (see messaging 315) sent by UE 205 contains EMSKname@Domain-name, and in addition the SEQ associated with the rIK, Cryptosuite, and authentication Tag (e.g., MAC1).

In step 3, the new/target TNAP 303 (e.g., ER Authenticator) processes the message and sends (see messaging 321) an AAA message to the TNGF 213 (e.g., ER server) based on the realm part of the NAI (i.e., domain-name) by forwarding (see block 319) the received EAP-Initiate/Re-auth message. The TNGF information (e.g., TNGF IP address or TNGF ID) in the realm part (e.g., domain-name) of the NAI helps the new/target TNAP 303 to forward the message to the right TNGF 213 if it is reachable.

In step 4, the TNGF 213 (e.g., ER server) verifies (see block 323) the domain name and validity of the ERP message by checking the EMSKname in the username part of the NAI and using the SEQ associated with the rIK for integrity checking the ERP message (see block 325, FIG. 3B). If verification is successful, then the UE 205 is successfully authenticated. If the TNGF 213 does not have an rIK in its local memory, then the TNGF 213 fetches the re-authentication security context associated with the EMSKname and derives the rIK (as explained above and illustrated in block 328) to verify the received ERP message's integrity.

If the re-authentication is successful, the TNGF 213 (e.g., ER Server) generates a fresh rMSK (see blocks 327 and 328) and provides the rMSK to the new/target TNAP 303 (e.g., ER Authenticator) in the AAA response message (see step 5, messaging 329) along with the EAP-Finish/Re-auth message containing EMSKname@Domain-name, Sequence number (SEQ), Cryptosuite and MAC2. The MAC2 is the authentication tag for integrity protecting the ERP message sent from the TNGF 213 to the UE 205. The rMSK is generated using a KDF with the rRK, Trusted Access code, rMSK Label, and SEQ as parameters—e.g., derived using the following formula:

$$rMSK=KDF(rRK,Trusted\ Access\ code,rMSK\ Label|`\backslash 0`|SEQ|length) \qquad \text{Equation 7}$$

Note that the (rRK), the (Trusted Access code), and the (rMSK Label|'\0'|SEQ|length) are three inputs to the KDF, where the '|' operator indicates concatenation. As used herein, the parameter "rMSK Label" refers to a string (e.g., 8-bit ASCII string). Here, the value '\0' may be used to show separation between various inputs and length. The length field refers to the length (e.g., in octets) of the derived key (i.e., the rMSK in Equation 7).

The new/target TNAP 303 (e.g., ER Authenticator) retrieves the rMSK and forwards (see messaging 331) the EAP-Finish/Re-auth message to the UE 205.

In step 6, the UE 205 verifies (see block 333) the MAC2 using the SEQ associated with the rIK and derives (see blocks 335 and 336) the rMSK similar to the TNGF 213 as described in step 4c. Alternatively, the UE 205 and the TNGF 213, based on the described implementation, can derive, and use, fresh rIKs for MAC1 and MAC2 computations respectively by using a most recent SEQ number as the input as described above with respect to steps 4a-b above. When an rIK is derived and used, the associated SEQ can be incremented at the UE 205 and the TNGF 213 accordingly.

In step 7, the UE 205 and the new/target TNAP 303 (e.g., ER Authenticator) use the freshly derived rMSK (e.g., TNAP key) to derive security keys according to the applied non-3GPP technology and to establish (see messaging 337) a security association, e.g., a IPsec SA, to protect subsequent traffic between the UE 205, the new/target TNAP 303, and the TNGF 213 (see connection 339).

Figure 4A:
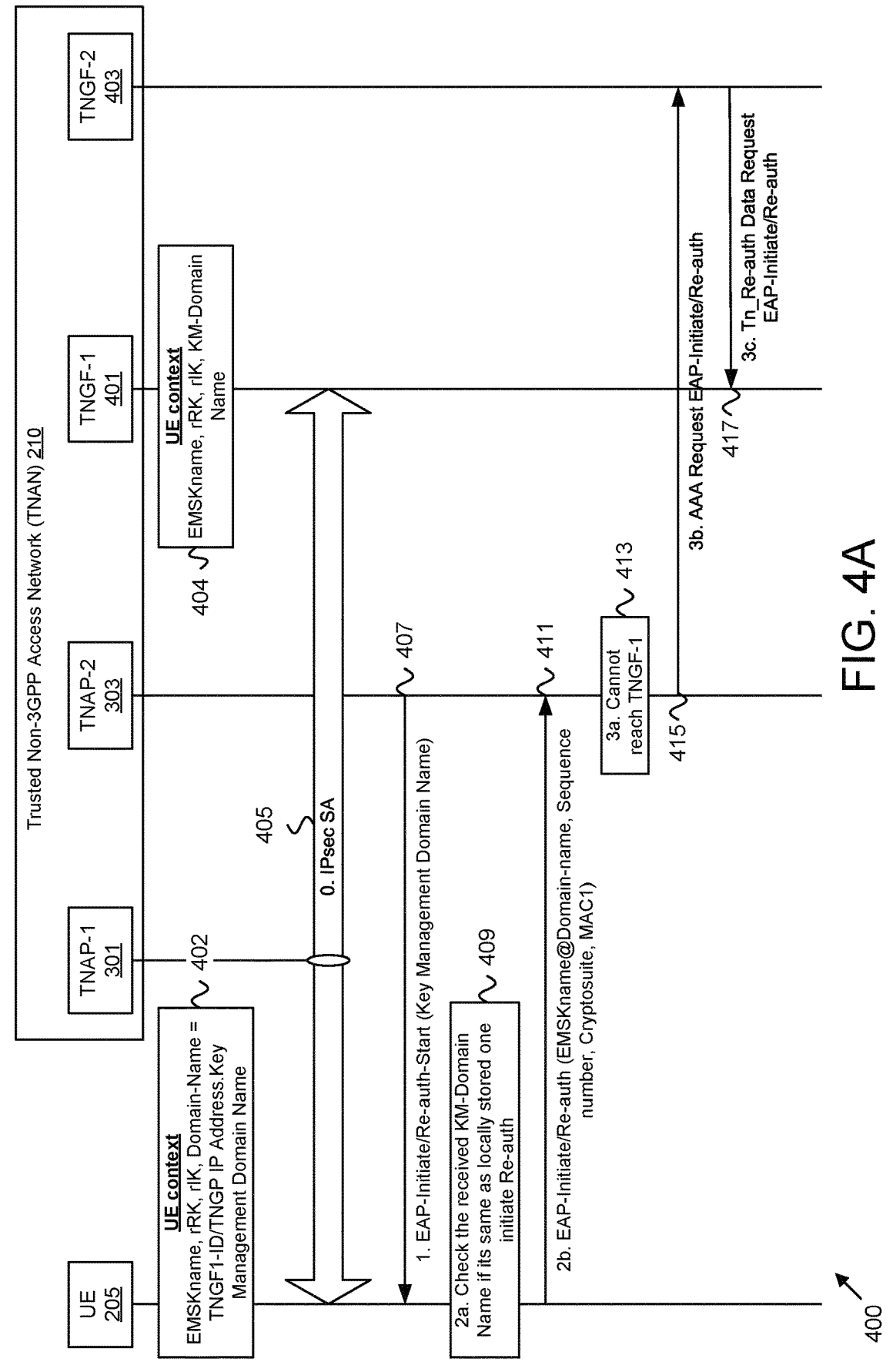
FIG. 4A is a signal flow diagram illustrating one embodiment of a second solution for remote unit reauthentication.
Figure 4B:
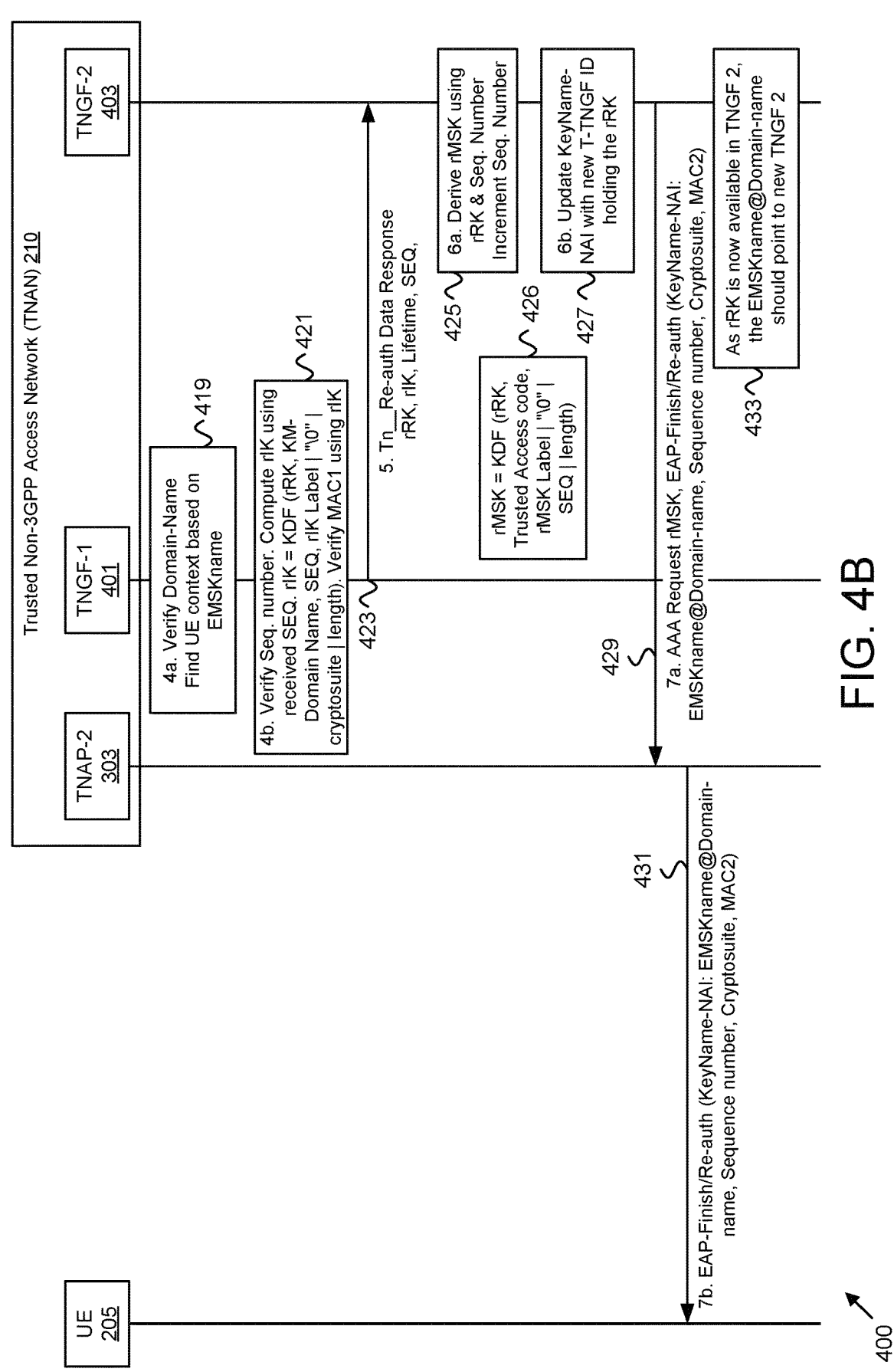
FIG. 4B is a continuation of the procedure depicted in FIG. 4A.
Figure 4C:
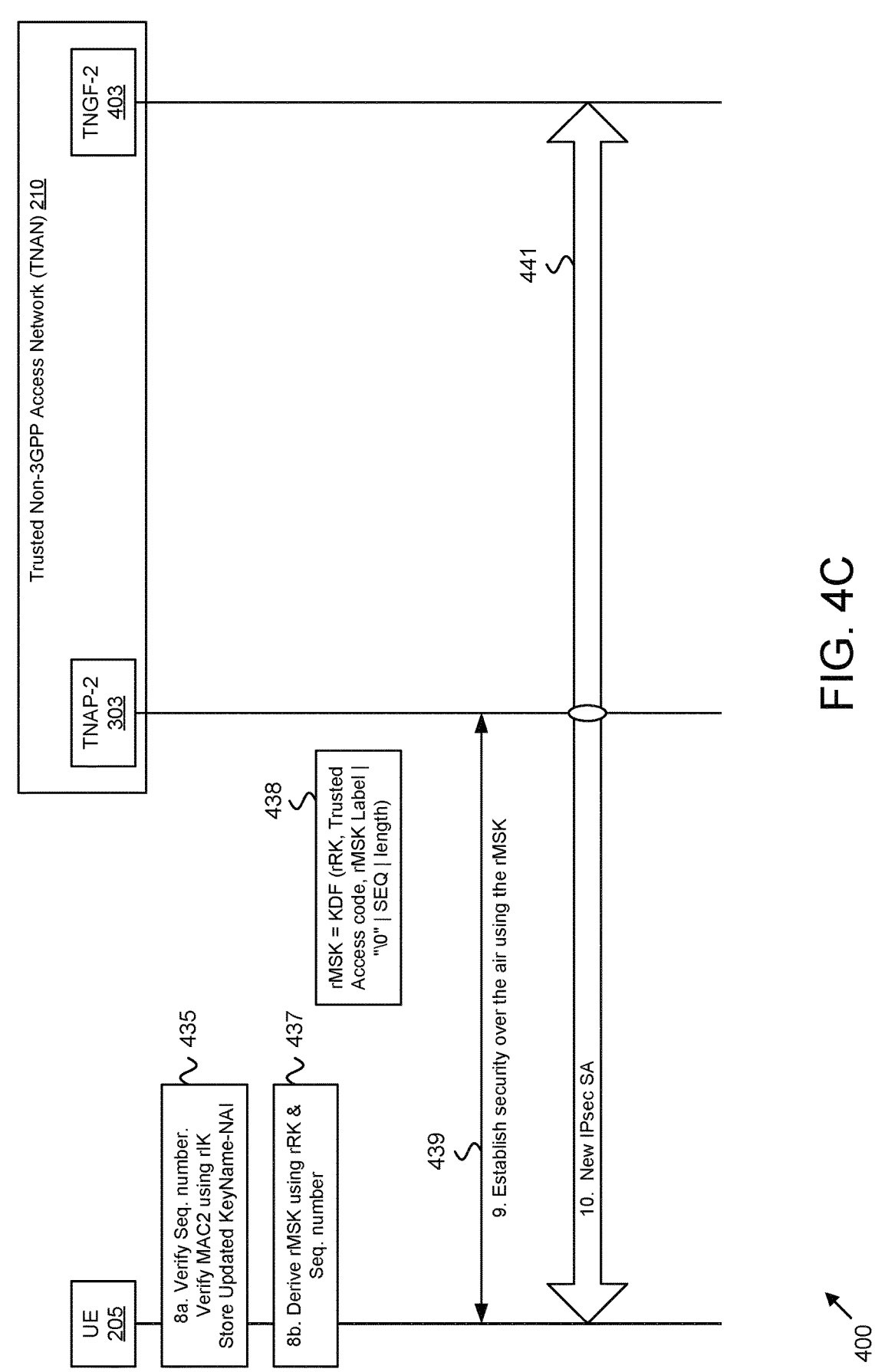
FIG. 4C is a continuation of the procedure depicted in FIG. 4B.

FIGS. 4A-4C depict a procedure for a 5G re-authentication over a trusted non-3GPP access network, according to embodiments of the disclosure. The procedure 400 involves the UE 205 (e.g., one embodiment of the remote unit 105), a first/current TNAP 301, a second/new/target TNAP 303, a source TNGF 401, and a target TNGF 403 in the TNAN 210.

An Inter-TNGF Mobility is defined as the mobility of a UE 205 between two TNAPs 301, 303 connected to two different TNGFs 401, 403. If two TNGFs 401, 403 belong to the same operator's network, e.g., TNAN 210, and if the source TNGF 401 and target TNGF 403 are connected with a Tn interface, then the UE 205 can be re-authenticated using ERP based on the re-authentication security context (see blocks 402, 404) made available to the Source TNGF 401.

As shown in FIGS. 4A-4C, in step 0, an IPsec security association ("SA") connection (see connection 405) is established between the UE 205, the current TNAP 301, the new/target TNAP 303, and the source TNGF 401 in the TNAN 210. In step 1, ERP exchange is triggered by the new/target TNAP 303 (e.g., ER Authenticator) by sending an EAP-Initiate/Re-auth-Start message (see messaging 407) with the Key Management Domain Name ("KM-Domain Name") to the UE 205.

The UE 205 and the source TNGF 401 may both have locally stored instances of the UE context (i.e., re-authentication security context), including the EMSKname, rRK, rIK, KM-Domain Name, and TNGF ID/IP address (see block 402 for the UE 205 and block 404 for the TNGF 213). Accordingly, in step 2, the UE 205 verifies (see block 409) the locally stored KM-Domain Name and the one received from the new/target TNAP 303 are the same. If so, then the UE 205 forms the Keyname-NAI as EMSKname@Domain-name and sends (see messaging 411) an EAP-Initiate/Re-auth message to the new/target TNAP 303 (e.g., ER Authenticator).

The domain name here includes only the previously authenticated/re-authenticated TNGFs 401 info i.e., for TNGF ID or TNGP IP address, because only that TNGF 401 contains the re-authentication security context of the UE 205. The domain-name used in the realm of NAI is generated by the UE 205 using the values for TNGF Info and KM-Domain Name as follows: TNGF-ID.KM-Domain Name. If the UE 205 contains a previously derived rIK (derived as explained above and shown in block 307) related to the KM-Domain Name, it uses the rIK to integrity protect the ERP exchanges between the UE 205 and the TNGF 401 (e.g., ER Server).

If the UE 205 does not have a locally stored instance of a previously derived rIK, then a static or a fresh rIK (if the UE determines to derive fresh rIK) can be derived by the UE 205. A static rIK, e.g., an rIK that does not change for every ERP run, is derived using as KDF according to Equation 6, above. A fresh rIK, e.g., an rIK that is generated for every ERP run or when required, is derived using a KDF according to Equation 5, above. Note the use of a sequence number ("SEQ") as a parameter for generating a fresh rIK for every ERP run or when required. The SEQ is incremented after every usage as input to key derivation to ensure freshness of the key (such as rIK and session key). The EAP-Initiate/Re-auth message (see messaging 411) sent by UE 205 contains EMSKname@Domain-name, and in addition the SEQ associated with the rIK, Cryptosuite, and authentication Tag (e.g., MAC1).

In step 3, the new TNAP 303 (e.g., ER Authenticator) processes the message, e.g., as in IETF RFC 6696, and finds that the source TNGF 401 specified in the domain-name is not reachable to the new TNAP 303 (see block 413). The new TNAP 303 sends (see messaging 415) a AAA message to the new target TNGF 403 (e.g., ER server) based on the KM-Domain Name by forwarding the received EAP-Initiate/Re-auth message.

Alternatively, the TNGF information (e.g., the TNGP IP address or ID) in the realm part (e.g., the domain name) of the NAI helps the new/target TNAP 303 to forward the message to the right TNGF 403 if it is reachable and in that case the procedure is similar to the intra-TNGF mobility as described above.

The target TNGF 403 (e.g., ER server 2) verifies the KM-domain name and, based on EMSKname in the NAI username, finds that the TNGF 403 does not have any re-authentication security context for the UE 205 at its side. The target TNGF 403, however, determines from the NAI realm part that the domain name contains a TNGF IP address and/or TNGF ID of the source TNGF 401 with which the target TNGF 403 has a Tn interface. The target TNGF 403 determines to forward (see messaging 417) the EAP-Initiate/Re-auth message in Re-auth Data Request over the Tn interface to the source TNGF 401.

In step 4, FIG. 4B, the source TNGF 401 verifies (see block 419) the domain name in the received NAI realm part and checks the validity (see block 421) of the ERP message by checking the EMSKname in the username part of the NAI and using the SEQ associated with rIK for integrity check of the ERP message. The source TNGF 401 uses the static rIK locally stored (derived as explained above) and associated with the SEQ and EMSKname, if the static rIK is used based on UE 205 and TNGF 401 implementations.

Alternatively, a fresh rIK (derived as explained above) is used by the UE 205 and the source TNGF 401 based on the operator's implementation, e.g., the TNAN 210 configuration/implementation. The source TNGF derives and uses the rIK associated with the SEQ received by fetching the re-authentication security context associated with the EMSKname to verify the received ERP message's integrity.

In step 5, if the verification of MAC1 is successful and if the received KM-Domain matches the KM-Domain locally stored, then the source TNGF 401 provides the re-authentication security context (e.g., rRK, rIK, SEQ, rRK Lifetime) to the target TNGF 403 in the Tn Re-auth Data Response message (see messaging 423).

In step 6, if the re-authentication security is successfully received, the target TNGF 403 locally stores the re-authentication security context (e.g., rRK, rIK (can be a fresh or static rIK), EMSKname, Lifetime, SEQ, updated domain name). Further, the target TNGF 403 (e.g., ER Authenticator) generates or derives (see blocks 425 and 426) a fresh rMSK, e.g., by incrementing the SEQ value and using Equation 7, as specified above, and updates (see block 427) the realm part of the KeyName-NAI, e.g., domain name with its TNGF IP address and/or ID.

In step 7, the target TNGF 403 provides the new rMSK to the new/target TNAP 303 (e.g., ER Authenticator) in the AAA Response message (see messaging 429) along with the EAP-Finish/Re-auth message containing updated EMSKname@Domain-name (where the updated EMSKname@Domain-name contains the target TNGF 403 info in the domain name part as it holds currently the re-authentication security context), sequence number ("SEQ"), Cryptosuite and MAC2. MAC2 is the authentication tag for integrity protecting the ERP message sent from target TNGF 403 to the UE 205.

The new/target TNAP 303 (e.g., ER Authenticator) retrieves the rMSK and forwards (see messaging 431) the EAP-Finish/Re-auth containing updated KeyName-NAI: EMSKname@Domain-name, sequence number ("SEQ"), Cryptosuite, and MAC2 to the UE 205. As shown in block 433, as rRK is now available in TNGF 2, the EMSKname@Domain-name should point to the target TNGF 403.

In step 8, FIG. 4C, the UE 205 verifies (see block 435) the MAC2 using the SEQ associated with rIK and derives rMSK (see blocks 437 and 438) similar to the target TNGF 403, e.g., using Equation 7, as specified above. The UE 205 further verifies the domain name in the received KeyName-.NAI and if it is different from the locally stored domain name, the UE 205 saves the recently received domain name along with the re-authentication security context and deletes the old (previously stored) domain name form its memory.

Alternatively, the UE 205 and the target TNGF 403, based on the implementation, can derive, and use, fresh rIKs for MAC1 and MAC2 computations respectively by using an SEQ number as the input as explained above. Whenever a rIK is derived and used, the associated SEQ is incremented at the UE 205 and the target TNGF 403 accordingly.

In step 9, the UE 205 and the new/target TNAP 303 (e.g., ER Authenticator) uses the freshly derived rMSK (e.g., TNAP key) to derive security keys according to the applied non-3GPP technology and to establish (see messaging 439) a security association, e.g., a IPsec SA, to protect subsequent traffic between the UE 205, the new/target TNAP 303, and the TNGF 403 (see connection 441).

Figure 5:
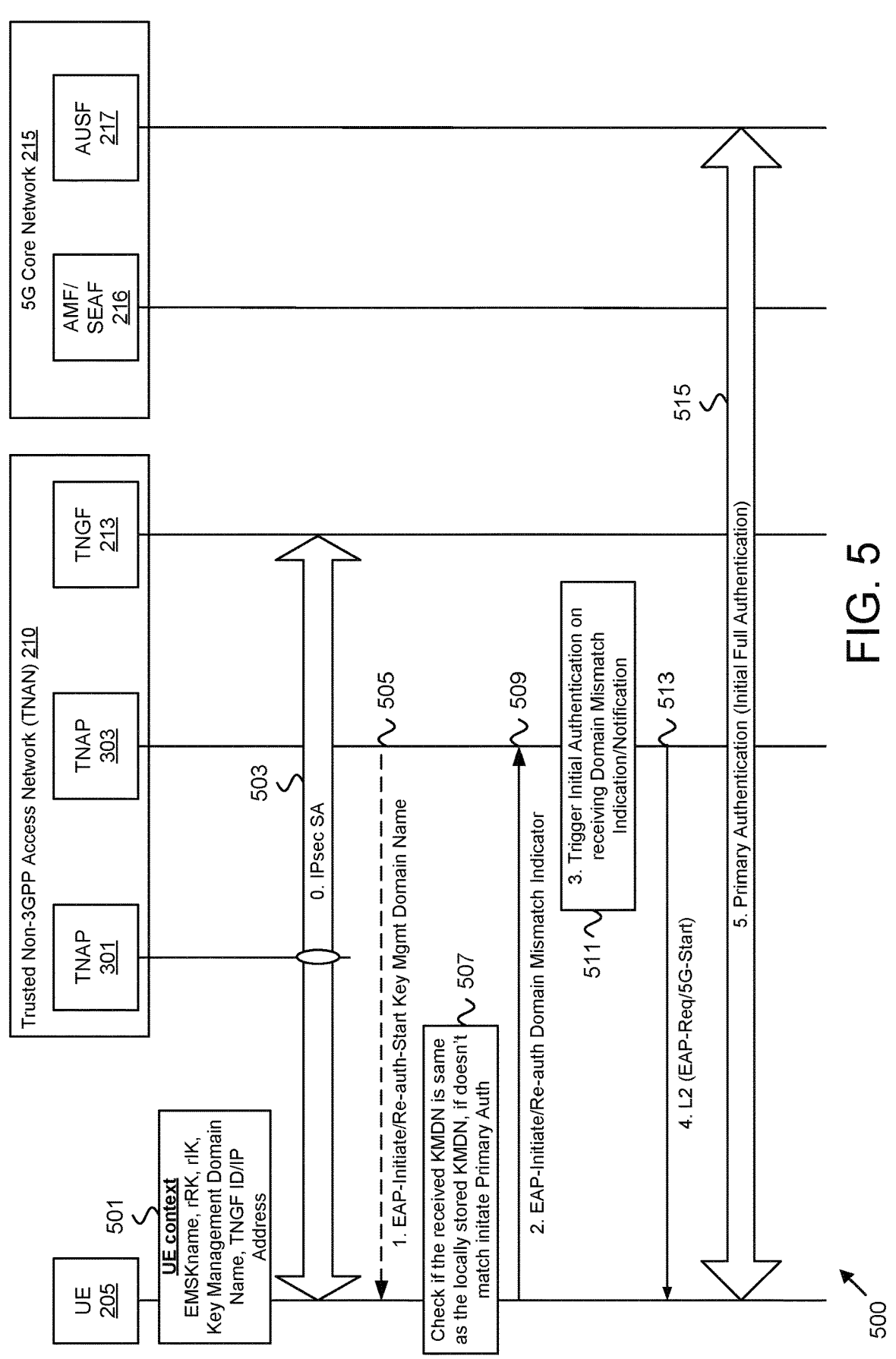
FIG. 5 is a signal flow diagram illustrating one embodiment of a third solution for remote unit reauthentication.

FIG. 5 depicts a procedure 500 for an EAP-5G session over a trusted non-3GPP access network, according to embodiments of the disclosure. The procedure 500 involves the UE 205 (e.g., one embodiment of the remote unit 105), a TNAN 210 (e.g., one embodiment of the TNAN 120) comprising a current TNAP 301 a target TNAP 303, and a TNGF 213 (e.g., one embodiment of the TNGF 123), and a 5G core network 215 (e.g., one embodiment of the mobile core network 140). In the most typical case, the trusted non-3GPP access network 210 is a WLAN access network complying with the IEEE 802.11 specification.

The key management domain as defined above plays a main role in controlling the sharing of the UE's re-authentication security context among only TNGFs 213 that belong to the same key management domain. If a UE 205 moves to a different TNAP 303 that is connected to a new TNGF 213 that belongs to a different key management domain, then the new TNGF 213 will not be provided with re-authentication security context by the old TNGF 213 whose key management domain is different.

Hence, the UE 205 cannot perform re-authentication with a new TNGF 213 belonging to a different key management domain, using its locally stored re-authentication security context. Consequently, an initial primary authentication is triggered with the new TNAP 303 and new TNGF 213 belonging to a different key management domain. FIG. 5 describes how a key management domain control can be imposed by the TNAN 210 and the UE 205 to ensure safety and reliability of the re-authentication security context among a group of network functions/entities forming a key management domain.

As shown in FIG. 5, in step 0, an IPsec security association ("SA") connection (see connection 503) is established between the UE 205, the current TNAP 301, the new/target TNAP 303, and the TNGF 213 in the TNAN 210. In step 1, ERP exchange is triggered by the new/target TNAP 303 (e.g., ER Authenticator) by sending an EAP-Initiate/Re-auth-Start message (see messaging 505) with the Key Management Domain Name ("KM-Domain Name") to the UE 205.

The UE 205 may have locally stored instances of the UE context (i.e., UE re-authentication security context) (see block 501), including the EMSKname, rRK, rIK, KM-Domain Name, and TNGF ID/IP address. Accordingly, the UE 205 verifies (see block 507) the locally stored KM-Domain Name and the one received from the new/target TNAP 303 are the same. If not, then the UE 205 sends a 'Domain Mismatch Indicator' (can alternatively be called a KM-Domain Mismatch Indicator/Flag) to the target TNAP 303 in the EAP-Initiate/Re-auth message (see messaging 509).

In step 3, the new/target TNAP 303 triggers (see block 511) an initial EAP full authentication (e.g., primary authentication) for the UE 205 with the 5G core network 215 via the associated TNGF 213 in response to the received 'Domain Mismatch Indicator'.

In step 4, the new/target TNAP 303 sends the EAP-Req/5G-Start message (see messaging 513) over L2 to the UE 205 to initiate the primary authentication. In step 5, primary authentication (see 515) follows the procedure 200 described above in reference to FIGS. 2A-2C.

Figure 6:
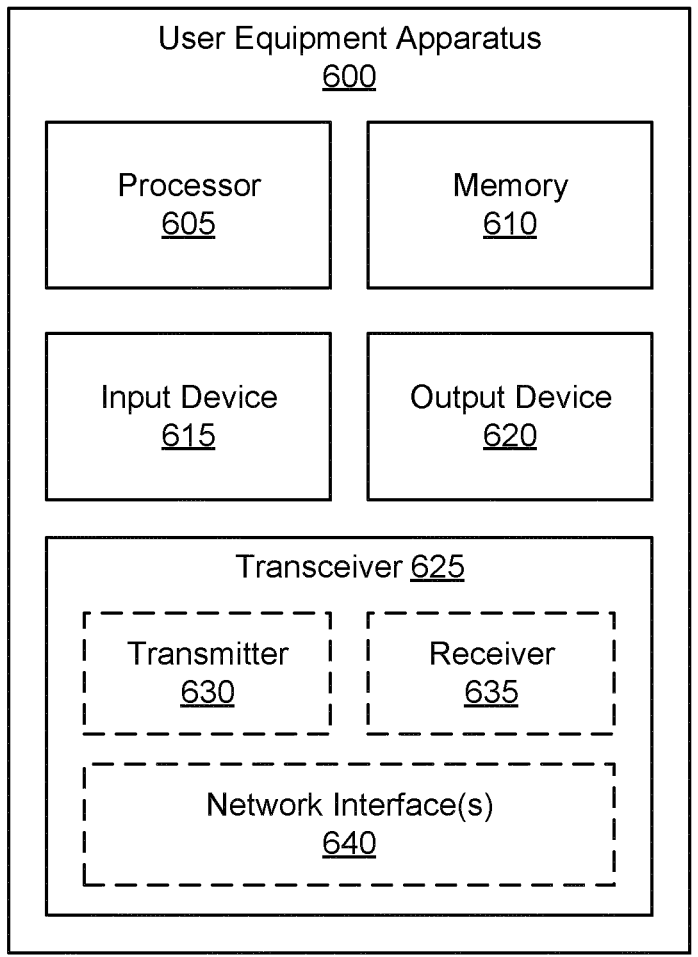
FIG. 6 is a block diagram illustrating one embodiment of a user equipment apparatus that supports remote unit reauthentication.

FIG. 6 depicts one embodiment of a user equipment apparatus 600, according to embodiments of the disclosure. The user equipment apparatus 600 may be one embodiment of the remote unit 105 and/or the UE 205. Furthermore, the user equipment apparatus 600 may include a processor 605, a memory 610, an input device 615, an output device 620, a transceiver 625. In some embodiments, the input device 615 and the output device 620 are combined into a single device, such as a touch screen. In certain embodiments, the user equipment apparatus 600 does not include any input device 615 and/or output device 620.

As depicted, the transceiver 625 includes at least one transmitter 630 and at least one receiver 635. Here, the transceiver 625 communicates with a mobile core network (e.g., a 5GC) via an access network. Additionally, the transceiver 625 may support at least one network interface 640. Here, the at least one network interface 640 facilitates communication with an TNGF (e.g., using the "NWt" interface). Additionally, the at least one network interface 640 may include an interface used for communications with an AMF, an SMF, and/or a UPF.

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In various embodiments, the processor 605 controls the user equipment apparatus 600 to implement the above described UE behaviors. In some embodiments, the processor 605 sends (via the transceiver 625) a first authentication message to a network function to authenticate with the mobile communication network. Here, the first authentication message contains an indicator that the apparatus supports ERP. The processor 605 receives (via the transceiver 625) a second authentication message from the network function in response to the first authentication message, where the second authentication message contains a key management domain name, the key management domain name indicating a group of network functions that can share reauthentication security context for the apparatus to perform ERP. In response to successful authentication with the mobile communication network, the processor 605 derives reauthentication security context and locally stores (i.e., in the memory 610) the received key management domain name and the derived reauthentication security context for subsequent reauthentication with the mobile communication network.

In some embodiments, the network function comprises a gateway function of the mobile communication network (i.e., a TNGF in a TNAN), the gateway function fetching reauthentication security context for subsequent reauthentication of the apparatus in response to the first authentication message including the ERP indicator.

In some embodiments, the derived reauthentication security context includes an rRK and a key identifier for the rRK (i.e., EMSKname and/or Kausfname). In such embodiments, the rRK is derived using a key derivation function based on an EMSK, a SUPI, and a serving network name (e.g., 5G: Serving Network ID). Alternatively, the rRK is derived using a key derivation function based on an authentication server function key (i.e., AUSF key), the SUPI, and the serving network name.

In certain embodiments, in response to deriving the rRK based on the EMSK, the processor 605 derives a key identifier for the rRK (i.e., "EMSKname") using a key derivation function based on at least the SUPI and the serving network name. In other embodiments, in response to deriving the rRK based on the AUSF key, the processor 605 derives a key identifier for the rRK (i.e., "Kausfname") using a key derivation function based on the SUPI, the serving network name, and the AUSF key, where Kausfname is used for subsequent reauthentication procedures.

In some embodiments, the processor 605 further receives a third authentication message from a new access point of the mobile communication network (e.g., TNAP-2) in response to the user equipment apparatus 600 connecting to the new access point in the TNAN. Here, the third authentication message includes a second key management domain name.

In certain embodiments, the processor 605 derives a reauthentication integrity key (i.e., "rIK") for securely exchanging and verifying ERP messages with the network function, where the processor 605 derives the rIK at least in part from the key management domain name and a sequence number (i.e., "SEQ"). In such embodiments, the processor 605 may further increment a received SEQ prior to using the SEQ to derive the rIK.

In certain embodiments, the processor 605 verifies whether the second key management domain name matches the locally stored key management domain name associated with the reauthentication security context. In such embodiments, the processor 605, in response to verifying that the second key management domain name matches the locally stored key management domain name, further generates a NAI and sends a fourth authentication message comprising the NAI to the new access point, the generated NAI stored locally at the apparatus for subsequent reference.

In certain embodiments, the NAI is generated based on a key identifier for an rRK (i.e., "EMSKname") and a domain-name, the domain-name generated using an identifier for a previously authenticated network gateway function in the TNAN and the key management domain name such that the NAI has a form of "EMSKname@Domain-name."

In some embodiments, the processor 605 further receives a fifth authentication message comprising an updated NAI from the new access point and verifies that the domain-name for the updated NAI matches the locally stored domain name. In certain embodiments, the processor 605, in response to verifying that the domain-name for the updated NAI matches the locally stored domain-name, deletes the current locally stored domain-name and locally stores the updated domain-name and re-authentication security context.

In some embodiments, the processor 605, in response to verifying that the received key management domain name fails to match the locally stored key management domain name, sends a domain mismatch indicator to the new access point in an EAP-Initiate/RE-auth message to trigger initial EAP full authentication for the apparatus.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data relating to supporting remote unit reauthentication, for example storing security keys, IP addresses, and the like. In certain embodiments, the memory 610 also stores program code and related data, such as an operating system ("OS") or other controller algorithms operating on the user equipment apparatus 600 and one or more software applications.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, may include any known electronically controllable display or display device. The output device 620 may be designed to output visual, audible, and/or haptic signals. In some embodiments, the output device 620 includes an electronic display capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, all or portions of the output device 620 may be located near the input device 615.

As discussed above, the transceiver 625 communicates with one or more network functions of a mobile communication network via one or more access networks. The transceiver 625 operates under the control of the processor 605 to transmit messages, data, and other signals and also to receive messages, data, and other signals. For example, the processor 605 may selectively activate the transceiver (or portions thereof) at particular times in order to send and receive messages.

The transceiver 625 may include one or more transmitters 630 and one or more receivers 635. Although only one transmitter 630 and one receiver 635 are illustrated, the user equipment apparatus 600 may have any suitable number of transmitters 630 and receivers 635. Further, the transmitter (s) 630 and the receiver(s) 635 may be any suitable type of transmitters and receivers. In one embodiment, the transceiver 625 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 625, transmitters 630, and receivers 635 may be implemented as physically separate components that access a shared hardware resource and/or software resource, such as for example, the network interface 640.

In various embodiments, one or more transmitters 630 and/or one or more receivers 635 may be implemented and/or integrated into a single hardware component, such as a multi-transceiver chip, a system-on-a-chip, an ASIC, or other type of hardware component. In certain embodiments, one or more transmitters 630 and/or one or more receivers 635 may be implemented and/or integrated into a multi-chip module. In some embodiments, other components such as the network interface 640 or other hardware components/circuits may be integrated with any number of transmitters 630 and/or receivers 635 into a single chip. In such embodiment, the transmitters 630 and receivers 635 may be logically configured as a transceiver 625 that uses one more common control signals or as modular transmitters 630 and receivers 635 implemented in the same hardware chip or in a multi-chip module.

Figure 7:
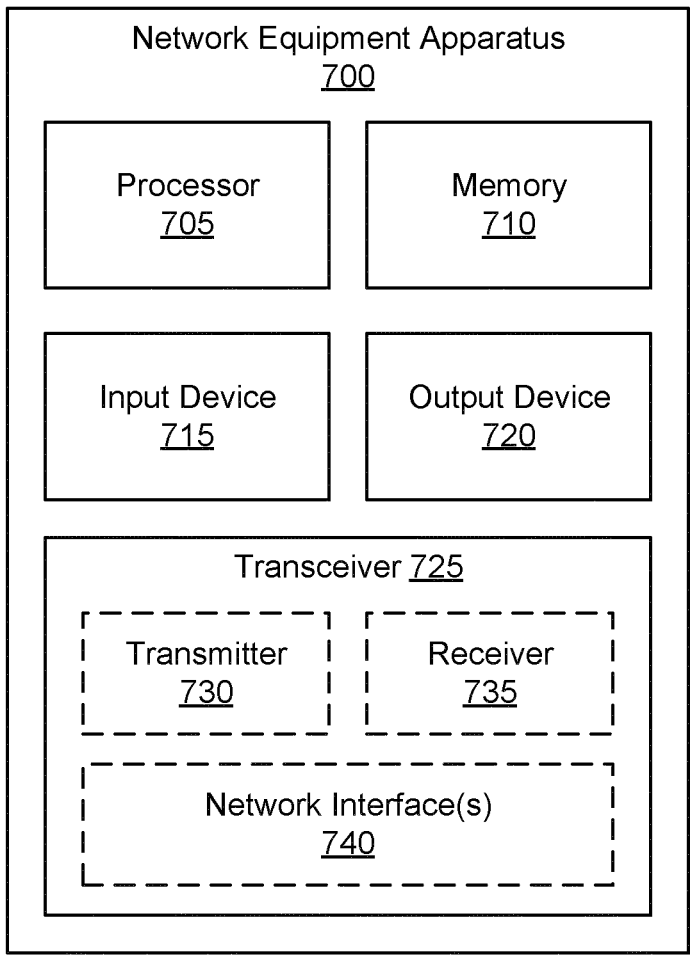
FIG. 7 is a block diagram illustrating one embodiment of a network equipment apparatus that supports remote unit reauthentication.

FIG. 7 depicts one embodiment of a network equipment apparatus 700, according to embodiments of the disclosure. In some embodiments, the network equipment apparatus 700 may be one embodiment of a TNGF (i.e., TNGF1 and/or TNGF2). In other embodiments, the network equipment apparatus 700 may be one embodiment of an AMF. Furthermore, network equipment apparatus 700 may include a processor 705, a memory 710, an input device 715, an output device 720, a transceiver 725. In some embodiments, the input device 715 and the output device 720 are combined into a single device, such as a touch screen. In certain embodiments, the network equipment apparatus 700 does not include any input device 715 and/or output device 720.

As depicted, the transceiver 725 includes at least one transmitter 730 and at least one receiver 735. Here, the transceiver 725 communicates with one or more remote units 105. Additionally, the transceiver 725 may support at least one network interface 740, such as the NWt, N2, and N3 interfaces depicted in FIG. 1. In some embodiments, the transceiver 725 supports a first interface for communicating with a RAN node, a second interface for communicating with one or more network functions in a mobile core network (e.g., a 5GC) and a third interface for communicating with a remote unit (e.g., UE).

The processor 705, in one embodiment, may include any known controller capable of executing computer-readable instructions and/or capable of performing logical operations. For example, the processor 705 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 705 executes instructions stored in the memory 710 to perform the methods and routines described herein. The processor 705 is communicatively coupled to the memory 710, the input device 715, the output device 720, and the first transceiver 725.

In various embodiments, the processor 705 controls the network equipment apparatus 700 to implement the above described TNGF behaviors. In some embodiments, the processor 705 receives a first authentication message for reauthenticating a remote unit (i.e., UE), where the first authentication message includes a Keyname-NAI comprising a first username (e.g., Keyname or other key identifier) and a first domain-name. Here, the first domain-name identifies a key management domain name and an associated gateway function holding the reauthentication security context. The processor 705 verifies the first domain-name and validates the first authentication message using at least the re-authentication Integrity Key ("rIK") from the security context identified by the first username. The processor 705 generates a second authentication message in response to successfully validating the first authentication message and responds to the first authentication message by sending the second authentication message via the network interface 740.

In some embodiments, the first authentication message contains a first sequence number (i.e., "SEQ") and a first message authentication code, where the processor 705 uses the first message authentication code to authenticate the remote unit. In some embodiments, the first username comprises a key identifier for a reauthentication root key (i.e., "rRK"). In certain embodiments, the processor 705 generates a fresh session key in response to validating the first authentication message, where the fresh session key is derived using at least the rRK and a trusted non-3GPP access code as input to key derivation.

In some embodiments, the processor 705 determines whether a reauthentication integrity key (i.e., "rIK") is stored in local memory. In certain embodiments, the processor 705 derives a fresh rIK using at least the rRK, the key management domain name, and the received SEQ number in response to the rIK not being stored in local memory or received a different SEQ of higher value than the locally stored SEQ, where the fresh rIK is used to authenticate the first message authentication code. In certain embodiments, the second authentication message contains a second message authentication code derived using the fresh rIK, where the remote unit uses the second message authentication code to authenticate the second apparatus.

In some embodiments, the first authentication message is received from a gateway function serving the remote unit. In such embodiments, the second authentication message comprises a reauthentication security context and is sent to the gateway function. In certain embodiments, the reauthentication security context contains the rRK, the rIK, the SEQ, and a rRK lifetime parameter. In other embodiments, the first authentication message is received from an access point serving the remote unit. In such embodiments, the second authentication message is sent to the remote unit via the serving access point.

In some embodiments, the processor 705 receives a registration request from the remote unit, the registration request indicating that the remote unit supports an ERP. In such embodiments, the processor 705 sends a gateway identifier and the key management domain name to the remote unit during a registration procedure for the remote unit.

In various embodiments, the processor 705 controls the network equipment apparatus 700 to implement the above described TNGF-2 behaviors. In such embodiments, the processor 705 receives a first authentication message for reauthenticating a remote unit (i.e., UE), where the first authentication message includes a Keyname-NAI comprising a first username (e.g., Keyname or other key identifier) and a first domain-name. Here, the first domain-name identifies a key management domain name and an associated gateway function holding a reauthentication security context. The processor 705 verifies the first domain-name and determines from the NAI (e.g., from TNGF identification information indicated as part of the first domain-name and the first username) that the reauthentication security context for the remote unit is held by a source gateway function (i.e., TNGF-1). The processor 705 forwards the first authentication message to the source gateway function based on associated gateway function contact information available as part of the first domain-name and receives the reauthentication security context from the source gateway function. The processor 705 generates a second authentication message in response to receiving the reauthentication security context and sends the second authentication message to the remote unit.

In some embodiments, the processor 705 updates the NAI (e.g., a domain-name portion of the Keyname-NAI) to point to the apparatus in response to receiving the reauthentication security context, where the second authentication message comprises the updated NAI. In some embodiments, the first username comprises a key identifier for a reauthentication root key (i.e., "rRK"), where the processor 705 generates a fresh session key in response to receiving the reauthentication security context, and where the fresh session key is derived using at least the rRK and a trusted non-3GPP access code as input to key derivation.

In some embodiments, the second authentication message contains a message authentication code derived using the reauthentication security context, where the remote unit uses the second message authentication code to authenticate the apparatus. In some embodiments, the reauthentication security context comprises the rRK, a fresh reauthentication integrity key (i.e., "rIK"), a sequence number (i.e., "SEQ"), and a reauthentication root key lifetime parameter.

In various embodiments, the processor 705 controls the network equipment apparatus 700 to implement the above described TNAP behaviors. In some embodiments, the processor 705 receives a first KM-Domain name from a gateway function during association between an access point and the gateway function, the first key management domain name forwarded to a remote unit (i.e., UE) for use in reauthentication. The processor 705 receives a first authentication message for reauthenticating the remote unit. In one embodiment, the first authentication message includes a key management domain name mismatch indictor. In another embodiment, the first authentication message includes a NAI (i.e., Keyname-NAI) comprising a first username and a first domain-name, where the first domain-name identifies a second KM-Domain name and an associated gateway function holding a reauthentication security context of the remote unit.

The processor 705 determines a key management domain name mismatch based on the first authentication message. In some embodiments, the processor 705 determining the key management domain name mismatch comprises identifying that the first authentication message includes the key management domain name mismatch indicator. In other embodiments, the processor 705 determines the key management domain name mismatch by examining the Keyname-NAI and identifying that the second KM-Domain name does not match the first KM-Domain name.

The processor 705 rejects reauthentication of the remote unit in response to the determined mismatch and triggers initial authentication with the remote unit in response to the rejected reauthentication.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data relating to supporting remote unit reauthentication, for example storing security keys, IP addresses, UE contexts, and the like. In certain embodiments, the memory 710 also stores program code and related data, such as an operating system ("OS") or other controller algorithms operating on the network equipment apparatus 700 and one or more software applications.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, may include any known electronically controllable display or display device. The output device 720 may be designed to output visual, audible, and/or haptic signals. In some embodiments, the output device 720 includes an electronic display capable of outputting visual data to a user. For example, the output device 720 may include, but is not limited to, an LCD display, an LED display, an OLED display, a projector, or similar display device capable of outputting images, text, or the like to a user. As another, non-limiting, example, the output device 720 may include a wearable display such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all or portions of the output device 720 may be integrated with the input device 715. For example, the input device 715 and output device 720 may form a touchscreen or similar touch-sensitive display. In other embodiments, all or portions of the output device 720 may be located near the input device 715.

As discussed above, the transceiver 725 may communicate with one or more remote units and/or with one or more interworking functions that provide access to one or more PLMNs. The transceiver 725 may also communicate with one or more network functions (e.g., in the mobile core network 140). The transceiver 725 operates under the control of the processor 705 to transmit messages, data, and other signals and also to receive messages, data, and other signals. For example, the processor 705 may selectively activate the transceiver (or portions thereof) at particular times in order to send and receive messages.

The transceiver 725 may include one or more transmitters 730 and one or more receivers 735. In certain embodiments, the one or more transmitters 730 and/or the one or more receivers 735 may share transceiver hardware and/or circuitry. For example, the one or more transmitters 730 and/or the one or more receivers 735 may share antenna(s), antenna tuner(s), amplifier(s), filter(s), oscillator(s), mixer(s), modulator/demodulator(s), power supply, and the like. In one embodiment, the transceiver 725 implements multiple logical transceivers using different communication protocols or protocol stacks, while using common physical hardware.

Figure 8:
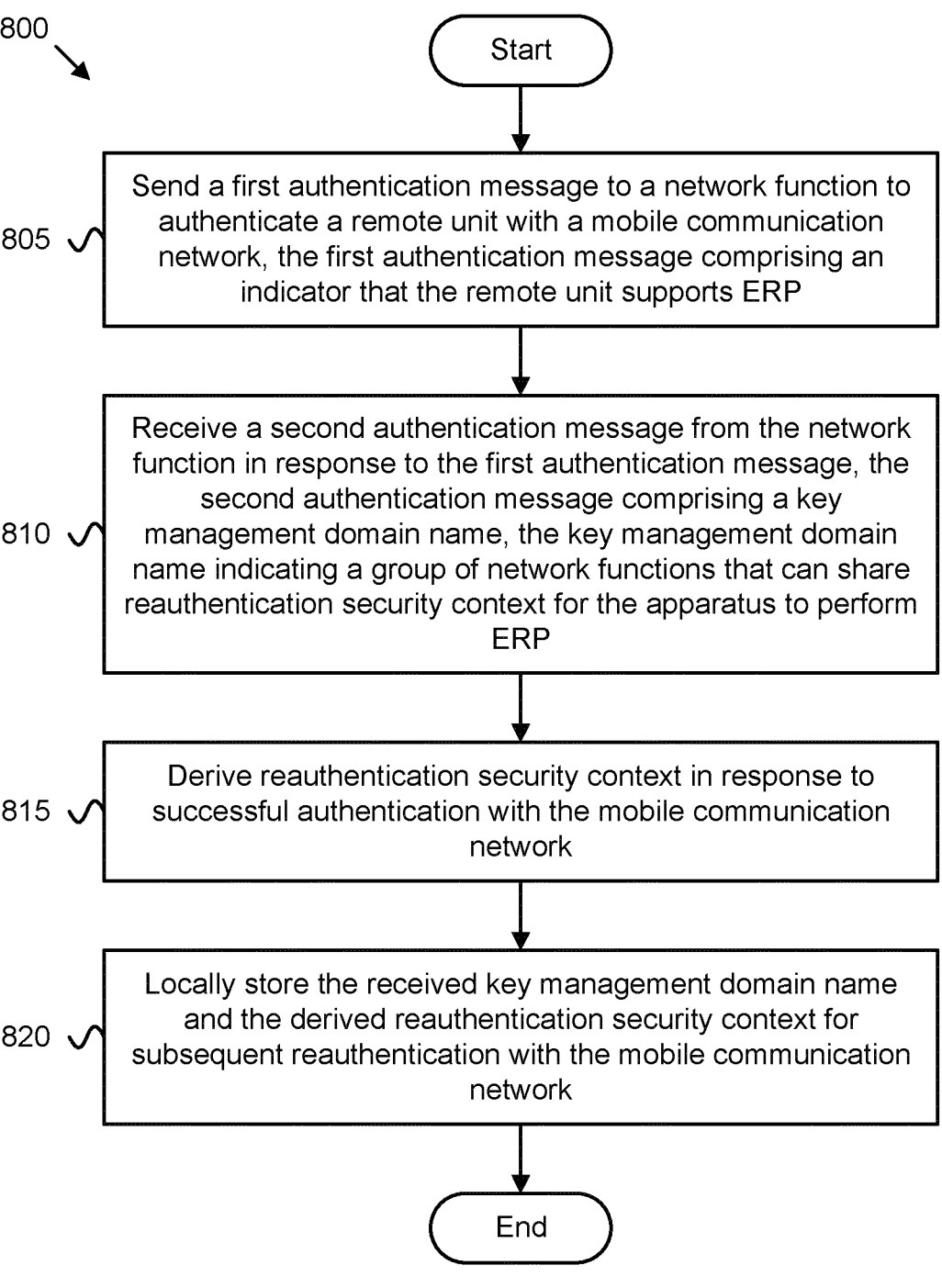
FIG. 8 is a flow chart diagram illustrating one embodiment of a first method for supporting remote unit reauthentication.

FIG. 8 depicts one embodiment of a method 800 for supporting remote unit reauthentication, according to embodiments of the disclosure. In various embodiments, the method 800 is performed by a UE, such as the remote unit 105, the UE 205 and/or the user equipment apparatus 600, described above. In some embodiments, the method 800 is performed by a processor, such as a microcontroller, a microprocessor, a CPU, a GPU, an auxiliary processing unit, a FPGA, or the like.

The method 800 begins and sends 805 a first authentication message to a network function to authenticate a remote unit with a mobile communication network, the first authentication message containing an indicator that the remote unit supports ERP. The method 800 includes receiving 810 a second authentication message from the network function in response to the first authentication message, where the second authentication message contains a key management domain name, the key management domain name indicating a group of network functions that can share reauthentication security context for the apparatus to perform ERP.

The method 800 includes deriving 815 reauthentication security context in response to successful authentication with the mobile communication network. The method 800 includes locally storing 820 the received key management domain name and the derived reauthentication security context for subsequent reauthentication with the mobile communication network. The method 800 ends.

FIG. 9 depicts one embodiment of a method 900 for supporting remote unit reauthentication, according to embodiments of the disclosure. In various embodiments, the method 900 is performed by a TNGF, such as the TNGF-1

115, the TNGF-2 117, the TNGF 213, the TNGF-1 401, and/or the network equipment apparatus 700, described above. In some embodiments, the method 900 is performed by a processor, such as a microcontroller, a microprocessor, a CPU, a GPU, an auxiliary processing unit, a FPGA, or the like.

The method 900 begins and receives 905 a first authentication message for reauthenticating a remote unit, where the first authentication message includes a NAI containing a first username and a first domain-name. The method 900 includes validating 910 the first domain-name, where the first domain-name identifies a key management domain name and an associated gateway function holding the reauthentication security context.

The method 900 includes validating 915 the first authentication message using at least a reauthentication security context indicated by the first username. The method 900 includes generating 920 a second authentication message in response to successfully validating the first authentication message. The method 900 includes responding 925 to the first authentication message by sending the second authentication message. The method 900 ends.

FIG. 10 depicts one embodiment of a method 1000 for supporting remote unit reauthentication, according to embodiments of the disclosure. In various embodiments, the method 1000 is performed by a target TNGF, such as the TNGF-2 117, the TNGF-2 403, and/or the network equipment apparatus 700, described above. In some embodiments, the method 1000 is performed by a processor, such as a microcontroller, a microprocessor, a CPU, a GPU, an auxiliary processing unit, a FPGA, or the like.

The method 1000 begins and receives 1005 a first authentication message for reauthenticating a remote unit, where the first authentication message includes a NAI containing a first username and a first domain-name. The method 1000 includes verifying 1010 the first domain-name, where the first domain-name identifies a key management domain name and an associated gateway function holding a reauthentication security context.

The method 1000 includes determining 1015 from the NAI that the reauthentication security context for the remote unit is held by a source gateway function. The method 1000 includes forwarding 1020 the first authentication message to the source gateway function. The method 1000 includes receiving 1025 the reauthentication security context from the source gateway function.

The method 1000 includes generating 1030 a second authentication message in response to receiving the reauthentication security context. The method 1000 includes sending 1035 the second authentication message to the remote unit. The method 1000 ends.

FIG. 11 depicts one embodiment of a method 1100 for supporting remote unit reauthentication, according to embodiments of the disclosure. In various embodiments, the method 1100 is performed by a non-3GPP access point, such as the base unit 100, the TNAP 211, the TNAP-2 303, and/or the network equipment apparatus 700, described above. In some embodiments, the method 1100 is performed by a processor, such as a microcontroller, a microprocessor, a CPU, a GPU, an auxiliary processing unit, a FPGA, or the like.

The method 1100 begins and receives 1105 a first key management domain name from a gateway function during association between an access point and the gateway function, the key management domain name forwarded to a remote unit for use in reauthentication.

The method 1100 includes receiving 1110 a first authentication message for reauthenticating the remote unit, where the first authentication message includes a either a Key management domain name mismatch indicator and/or a NAI containing a first username and a first domain-name, where the first domain-name identifies a second key management domain name and an associated gateway function holding a reauthentication security context of the remote unit.

The method 1100 includes determining 1115 a key management domain name mismatch. The method 1100 includes rejecting 1120 reauthentication of the remote unit in response to the determined mismatch. The method 1100 includes triggering 1125 initial authentication with the remote unit in response to the rejected reauthentication. The method 1100 ends.

Disclosed herein is a first apparatus for supporting remote unit reauthentication, according to embodiments of the disclosure. The first apparatus may be implemented by a UE, such as the remote unit 105, the UE 205 and/or the user equipment apparatus 600. The first apparatus includes a transceiver that communicates with a mobile communication network using a trusted non-3GPP access network TNAN and a processor that sends a first authentication message to a network function to authenticate with the mobile communication network, the first authentication message containing an indicator that the apparatus supports ERP. Via the transceiver, the processor receives a second authentication message from the network function in response to the first authentication message, where the second authentication message contains a key management domain name, the key management domain name indicating a group of network functions that can share reauthentication security context for the apparatus to perform ERP. In response to successful authentication with the mobile communication network, the processor derives reauthentication security context and locally stores the received key management domain name and the derived reauthentication security context for subsequent reauthentication with the mobile communication network.

In some embodiments, the network function comprises a gateway function of the mobile communication network, the gateway function fetching reauthentication security context for subsequent reauthentication of the apparatus in response to the first authentication message including the ERP indicator.

In some embodiments, the derived reauthentication security context comprises a reauthentication root key (i.e., "rRK") and a key identifier for the rRK. In one embodiment, the rRK is derived using a key derivation function based on an EMSK, a SUPI, and a serving network name/home network ID. In another embodiment, the rRK is derived using a key derivation function based on an AUSF key, the SUPI, and the serving network name/home network ID.

In certain embodiments, in response to deriving the rRK based on the EMSK, a key identifier for the rRK (i.e., "EMSKname") is derived using a key derivation function based on at least a SUPI and a serving network name/home network ID. In certain embodiments, in response to deriving the rRK based on the AUSF key, a key identifier for the rRK (i.e., "Kausfname") is derived using a key derivation function based on a SUPI, a serving network name/home network ID, and the AUSF key, where Kausfname is used for subsequent reauthentication procedures.

In some embodiments, the processor further receives a third authentication message from a new access point of the mobile communication network in response to the apparatus connecting to the new access point in the TNAN, the third authentication message comprising a second key management domain name.

In certain embodiments, the processor further derives a fresh reauthentication integrity key (i.e., "rIK") for securely exchanging and verifying ERP messages with the network function, the rIK derived at least in part from the key management domain name and a sequence number (i.e., "SEQ"). In such embodiments, the processor may further increment a received SEQ prior to using the SEQ to derive the fresh rIK.

In certain embodiments, the processor further verifies whether the second key management domain name matches the locally stored key management domain name associated with the reauthentication security context. In such embodiments, the processor, in response to verifying that the second key management domain name matches the locally stored key management domain name, further generates a NAI and sends a fourth authentication message comprising the NAI to the new access point, the generated NAI stored locally at the apparatus for subsequent reference.

In certain embodiments, the NAI of the form Keyname-NAI is generated based on a key identifier for an rRK (i.e., "EMSKname") and a domain-name, the domain-name generated using an identifier for a previously authenticated network gateway function in the TNAN and the key management domain name such that the NAI has a form of "EMSKname@Domain-name."

In some embodiments, the processor further receives a fifth authentication message comprising an updated NAI from the new access point and verifies that the domain-name for the updated NAI matches the locally stored domain name. In certain embodiments, the processor further, in response to verifying that the domain-name for the updated NAI matches the locally stored domain-name, deletes the current locally stored domain-name, and locally stores the updated domain-name and re-authentication security context.

In some embodiments, the processor, in response to verifying that the received key management domain name fails to match the locally stored key management domain name, sends a domain mismatch indicator to the new access point in an EAP-Initiate/RE-auth message to trigger initial EAP full authentication for the apparatus.

Disclosed herein is a first method for supporting remote unit reauthentication, according to embodiments of the disclosure. The first method may be performed by a UE, such as the remote unit 105, the UE 205 and/or the user equipment apparatus 600. The first method includes sending a first authentication message to a network function to authenticate the UE with a mobile communication network and receiving a second authentication message from the network function in response to the first authentication message. Here, the first authentication message contains an indicator that the UE supports ERP and the second authentication message contains a key management domain name, the key management domain name indicating a group of network functions that can share reauthentication security context for the UE to perform ERP. The first method includes deriving reauthentication security context in response to successful authentication with the mobile communication network and locally storing the received key management domain name and the derived reauthentication security context for subsequent reauthentication with the mobile communication network.

In some embodiments, the network function comprises a gateway function of the mobile communication network, the gateway function fetching reauthentication security context for subsequent reauthentication of the apparatus in response to the first authentication message including the ERP indicator.

In some embodiments, the derived reauthentication security context comprises a reauthentication root key (i.e., "rRK") and a key identifier for the rRK. In one embodiment, the rRK is derived using a key derivation function based on an EMSK, a SUPI, and a serving network name/home network ID. In another embodiment, the rRK is derived using a key derivation function based on an AUSF key, the SUPI, and the serving network name/home network ID.

In certain embodiments, in response to deriving the rRK based on the EMSK, a key identifier for the rRK (i.e., "EMSKname") is derived using a key derivation function based on at least a SUPI and a serving network name/home network ID. In certain embodiments, in response to deriving the rRK based on the AUSF key, a key identifier for the rRK (i.e., "Kausfname") is derived using a key derivation function based on a SUPI, a serving network name/home network ID, and the AUSF key, where Kausfname is used for subsequent reauthentication procedures.

In some embodiments, the first method further includes receiving a third authentication message from a new access point of the mobile communication network in response to the apparatus connecting to the new access point in the TNAN, the third authentication message comprising a second key management domain name.

In certain embodiments, the first method further includes deriving a fresh reauthentication integrity key (i.e., "rIK") for securely exchanging and verifying ERP messages with the network function, the rIK derived at least in part from the key management domain name and a sequence number (i.e., "SEQ"). In such embodiments, the first method may further include incrementing a received SEQ prior to using the SEQ to derive the fresh rIK.

In certain embodiments, the first method further includes verifying whether the second key management domain name matches the locally stored key management domain name associated with the reauthentication security context. In such embodiments, in response to verifying that the second key management domain name matches the locally stored key management domain name, the first method further includes generating a NAI and sends a fourth authentication message comprising the NAI to the new access point, the generated NAI stored locally at the apparatus for subsequent reference.

In certain embodiments, the NAI of the form Keyname-NAI is generated based on a key identifier for an rRK (i.e., "EMSKname") and a domain-name, the domain-name generated using an identifier for a previously authenticated network gateway function in the TNAN and the key management domain name such that the NAI has a form of "EMSKname@Domain-name."

In some embodiments, the first method further includes receiving a fifth authentication message comprising an updated NAI from the new access point and verifying that the domain-name for the updated NAI matches the locally stored domain name. In certain embodiments, in response to verifying that the domain-name for the updated NAI matches the locally stored domain-name, the first method includes deleting the current locally stored domain-name and locally storing the updated domain-name and re-authentication security context.

In some embodiments, the first method includes sending a domain mismatch indicator to the new access point in an EAP-Initiate/RE-auth message to trigger initial EAP full authentication for the remote unit in response to verifying that the received key management domain name fails to match the locally stored key management domain name.

Disclosed herein is a second apparatus for supporting remote unit reauthentication, according to embodiments of the disclosure. The second apparatus may be implemented by a TNGF, such as the TNGF-1 115, the TNGF-2 117, the TNGF 213, the TNGF-1 401, and/or the network equipment apparatus 700. The second apparatus includes a network interface that communicates with a mobile communication network and a processor that receives a first authentication message for reauthenticating a remote unit (i.e., UE), where the first authentication message includes a NAI comprising a first username and a first domain-name. The processor verifies the first domain-name and validates the first authentication message using at least a reauthentication security context indicated by the first username. Here, the first domain-name identifies a key management domain name and an associated gateway function holding the reauthentication security context. The processor generates a second authentication message in response to successfully validating the first authentication message and responds to the first authentication message by sending the second authentication message via the network interface.

In some embodiments, the first authentication message contains a first sequence number (i.e., "SEQ") and a first message authentication code, where the processor uses the first message authentication code to authenticate the remote unit. In some embodiments, the first username comprises a key identifier for a reauthentication root key (i.e., "rRK"). In certain embodiments, the processor generates a fresh session key in response to validating the first authentication message, where the fresh session key is derived using at least the rRK and a trusted non-3GPP access code as input to key derivation.

In some embodiments, the processor determines whether a reauthentication integrity key (i.e., "rIK") is stored in local memory. In certain embodiments, the processor derives a fresh rIK using at least the rRK, the key management domain name, and the received SEQ number in response to the rIK not being stored in local memory or received a different SEQ of higher value than the locally stored SEQ, where the fresh rIK is used to authenticate the first message authentication code. In certain embodiments, the second authentication message contains a second message authentication code derived using the fresh rIK, where the remote unit uses the second message authentication code to authenticate the second apparatus.

In some embodiments, the first authentication message is received from a gateway function serving the remote unit. In such embodiments, the second authentication message comprises a reauthentication security context and is sent to the gateway function. In certain embodiments, the reauthentication security context contains the rRK, the rIK, the SEQ, and a rRK lifetime parameter. In other embodiments, the first authentication message is received from an access point serving the remote unit. In such embodiments, the second authentication message is sent to the remote unit via the serving access point.

In some embodiments, the processor receives a registration request from the remote unit, the registration request indicating that the remote unit supports an ERP. In such embodiments, the processor sends a gateway identifier and the key management domain name to the remote unit during a registration procedure for the remote unit.

Disclosed herein is a second method for supporting remote unit reauthentication, according to embodiments of the disclosure. The second method may be implemented by a TNGF, such as the TNGF-1 115, the TNGF-2 117, the TNGF 213, the TNGF-1 401, and/or the network equipment apparatus 700. The second method includes receiving a first authentication message for reauthenticating a remote unit (i.e., UE). Here, the first authentication message includes a NAI containing a first username and a first domain-name. The second method includes verifying the first domain-name and validating the first authentication message using at least a reauthentication security context indicated by the first username. Here, the first domain-name identifies a key management domain name and an associated gateway function holding the reauthentication security context. The second method includes generating a second authentication message in response to successfully validating the first authentication message and responding to the first authentication message by sending the second authentication message.

In some embodiments, the first authentication message contains a first sequence number (i.e., "SEQ") and a first message authentication code, where TNGF uses the first message authentication code to authenticate the remote unit. In some embodiments, the first username comprises a key identifier for a reauthentication root key (i.e., "rRK"). In certain embodiments, the second method further includes generating a fresh session key in response to validating the first authentication message, where the fresh session key is derived using at least the rRK and a trusted non-3GPP access code as input to key derivation.

In some embodiments, the second method includes determining whether a reauthentication integrity key (i.e., "rIK") is stored in local memory. In certain embodiments, the second method further includes deriving a fresh rIK using at least the rRK, the key management domain name, and the received SEQ number in response to the rIK not being stored in local memory or received a different SEQ of higher value than the locally stored SEQ, where the fresh rIK is used to authenticate the first message authentication code. In certain embodiments, the second authentication message contains a second message authentication code derived using the fresh rIK, where the remote unit uses the second message authentication code to authenticate the TNGF.

In some embodiments, the first authentication message is received from a gateway function serving the remote unit. In such embodiments, the second authentication message comprises a reauthentication security context and is sent to the gateway function. In certain embodiments, the reauthentication security context contains the rRK, the rIK, the SEQ, and a rRK lifetime parameter. In other embodiments, the first authentication message is received from an access point serving the remote unit. In such embodiments, the second authentication message is sent to the remote unit via the serving access point.

In some embodiments, the second method further includes receiving a registration request from the remote unit, the registration request indicating that the remote unit supports an ERP. In such embodiments, the second method further includes sending a gateway identifier and the key management domain name to the remote unit during a registration procedure for the remote unit.

Disclosed herein is a third apparatus for supporting remote unit reauthentication, according to embodiments of the disclosure. The third apparatus may be implemented by a target TNGF, such as the TNGF-2 117, the TNGF-2 403, and/or the network equipment apparatus 700. The third apparatus includes a network interface that communicates with a mobile communication network and a processor that receives a first authentication message for reauthenticating a remote unit (i.e., UE), where the first authentication message includes a NAI comprising a first username and a first domain-name. The processor verifies the first domain-name and determines from the NAI that the reauthentication security context for the remote unit is held by a source gateway function. Here, the first domain-name identifies a key management domain name and an associated gateway function holding a reauthentication security context. The processor forwards the first authentication message to the source gateway function and receives the reauthentication security context from the source gateway function. The processor generates a second authentication message in response to receiving the reauthentication security context and sends the second authentication message to the remote unit.

In some embodiments, the processor updates the NAI to point to the apparatus in response to receiving the reauthentication security context, where the second authentication message comprises the updated NAI. In some embodiments, the first username comprises a key identifier for a reauthentication root key (i.e., "rRK"), where the processor generates a fresh session key in response to receiving the reauthentication security context, and where the fresh session key is derived using at least the rRK and a trusted non-3GPP access code as input to key derivation.

In some embodiments, the second authentication message contains a message authentication code derived using the reauthentication security context, where the remote unit uses the second message authentication code to authenticate the apparatus. In some embodiments, the reauthentication security context comprises the rRK, a fresh reauthentication integrity key (i.e., "rIK"), a sequence number (i.e., "SEQ"), and a reauthentication root key lifetime parameter.

Disclosed herein is a third method for supporting remote unit reauthentication, according to embodiments of the disclosure. The third method includes may be implemented by a target TNGF, such as the TNGF-2 117, the TNGF-2 403, and/or the network equipment apparatus 700. The third method includes receiving a first authentication message for reauthenticating a remote unit. Here, the first authentication message includes a NAI containing a first username and a first domain-name. The third method includes verifying the first domain-name and determining from the NAI that the reauthentication security context for the remote unit is held by a source gateway function. Here, the first domain-name identifies a key management domain name and an associated gateway function holding a reauthentication security context. The third method includes forwarding the first authentication message to the source gateway function and receiving the reauthentication security context from the source gateway function. The third method includes generating a second authentication message in response to receiving the reauthentication security context and sending the second authentication message to the remote unit.

In some embodiments, the third method includes updating the NAI to point to the apparatus in response to receiving the reauthentication security context, where the second authentication message comprises the updated NAI. In some embodiments, the first username comprises a key identifier for a reauthentication root key (i.e., "rRK"), where the third method includes generating a fresh session key in response to receiving the reauthentication security context, and where the fresh session key is derived using at least the rRK and a trusted non-3GPP access code as input to key derivation.

In some embodiments, the second authentication message contains a message authentication code derived using the reauthentication security context, where the remote unit uses the second message authentication code to authenticate the apparatus. In some embodiments, the reauthentication security context comprises the rRK, a fresh reauthentication integrity key (i.e., "rIK"), a sequence number (i.e., "SEQ"), and a reauthentication root key lifetime parameter.

Disclosed herein is a fourth apparatus for supporting remote unit reauthentication, according to embodiments of the disclosure. The fourth apparatus may be implemented by a non-3GPP access point, such as the base unit 100, the TNAP 211, the TNAP-2 303, and/or the network equipment apparatus 700. The fourth apparatus includes a transceiver that communicates with a remote unit and a processor that receives a key management domain name from a gateway function during association between an access point and the gateway function, the key management domain name forwarded to the remote unit for use in reauthentication. The processor receives a first authentication message for reauthenticating the remote unit. Here, the first authentication message includes one of: a key management domain name mismatch indicator and a NAI comprising a first username and a first domain-name, where the first domain-name identifies a key management domain name and an associated gateway function holding a reauthentication security context of the remote unit. The processor determines a key management domain name mismatch based on the first authentication message. The processor rejects reauthentication of the remote unit in response to the determined mismatch and triggers initial authentication with the remote unit in response to the rejected reauthentication.

Disclosed herein is a fourth method for supporting remote unit reauthentication, according to embodiments of the disclosure. The fourth method may be implemented by a non-3GPP access point, such as the base unit 100, the TNAP 211, the TNAP-2 303, and/or the network equipment apparatus 700. The fourth method includes receiving a key management domain name from a gateway function during association between an access point and the gateway function, the key management domain name forwarded to a remote unit for use in reauthentication. The fourth method includes receiving a first authentication message for reauthenticating the remote unit and determining a key management domain name mismatch. Here, the first authentication message includes a one of: a key management domain name mismatch indicator and NAI containing a first username and a first domain-name, where the first domain-name identifies a key management domain name and an associated gateway function holding a reauthentication security context of the remote unit. The fourth method includes determining a key management domain name mismatch based on the first authentication message. The fourth method includes rejecting reauthentication of the remote unit in response to the determined mismatch and triggering initial authentication with the remote unit in response to the rejected reauthentication.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment ("UE") for wireless communication, comprising:
    a memory; and
    a processor coupled with the memory and configured to cause the UE to:

transmit a first authentication message to a network function to authenticate with a mobile communication network, the first authentication message comprising an indicator that the UE supports EAP Reauthentication Protocol ("ERP");
    receive a second authentication message from the network function in response to the first authentication message, the second authentication message comprising a key management domain name, the key management domain name indicating a group of network functions that can share reauthentication security context for the UE to perform ERP;
    derive a reauthentication security context in response to successful authentication with the mobile communication network, wherein the reauthentication security context comprises a reauthentication root key ("rRK") and a key identifier for the rRK, wherein the rRK is derived using a subscription permanent identity ("SUPI") of the UE and at least a serving network name or a home network identifier ("ID") of the UE; and
    store, in the memory, the key management domain name and the reauthentication security context for subsequent reauthentication with the mobile communication network.

2. The UE of claim 1, wherein the network function comprises a gateway function of the mobile communication network.

3. The UE of claim 1, wherein the processor is configured to cause the UE to derive the rRK using a key derivation function based on one of:
    an extended master session key ("EMSK"), the SUPI, and the serving network name or the home network ID; and
    an authentication server function ("AUSF") key, the SUPI, and the serving network name or the home network ID.

4. The UE of claim 3, wherein, in response to deriving the rRK based on the EMSK, the processor is configured to cause the UE to derive a key identifier for the EMSK-based rRK ("EMSKname") is derived using a key derivation function based on at least the SUPI and the serving network name or the home network ID.

5. The UE of claim 3, wherein, in response to deriving the rRK based on the AUSF key, the processor is configured to cause the UE to derive a key identifier for the AUSF-based rRK ("Kausfname") for subsequent reauthentication procedures, wherein the Kausfname is derived using a key derivation function based on the SUPI, the serving network name or the home network ID, and the AUSF key.

6. The UE of claim 1, wherein the processor is configured to cause the UE to receive a third authentication message from a new access point of the mobile communication network in response to the UE connecting to the new access point in a trusted non-3GPP access network ("TNAN"), the third authentication message comprising a second key management domain name.

7. The UE of claim 1, wherein the processor is configured to cause the UE to derive a reauthentication integrity key ("rIK") for securely exchanging and verifying ERP messages with the network function, wherein the rIK is derived at least in part from the key management domain name and a sequence number ("SEQ").

8. The UE of claim 7, wherein the processor is configured to cause the UE to increment a received SEQ prior to using the SEQ to derive the rIK.

9. The UE of claim 6, wherein the processor is configured to cause the UE to verify whether the second key management domain name matches the stored key management domain name associated with the reauthentication security context.

10. The UE of claim 9, wherein in response to verifying that the second key management domain name matches the stored key management domain name, the processor is configured to cause the UE to:

generate a Network Access Identifier ("NAI"), transmit a fourth authentication message comprising the NAI to the new access point, and store the generated NAI in the memory.

11. The UE of claim 10, wherein the rRK is further based on an extended master session key ("EMSK"), wherein the NAI is generated based on a key identifier for the EMSK ("EMSKname") and a domain-name, wherein the NAI has a form of EMSKname@domain-name, and wherein the domain-name is generated using an identifier for a previously authenticated network gateway function in a trusted non-3GPP access network ("TNAN") and the key management domain name.

12. The UE of claim 6, wherein the processor is configured to cause the UE to:

receive a fifth authentication message comprising an updated Network Access Identifier ("NAI") from the new access point and verify that a domain-name for the updated NAI matches the stored key management domain name.

13. The UE of claim 12, wherein in response to verifying that the domain-name for the updated NAI matches the stored key management domain name, the processor is configured to cause the UE to:

delete the stored key management domain name; and store the domain-name for the updated NAI with the reauthentication security context.

14. The UE of claim 9, wherein in response to verifying that the second key management domain name fails to match the stored key management domain name, the processor is configured to cause the UE to transmit a domain mismatch indicator to the new access point in an EAP-Initiate/RE-auth message to trigger initial EAP full authentication for the UE.

15. A method performed by a user equipment ("UE"), the method comprising:

transmitting a first authentication message to a network function to authenticate a remote unit with a mobile communication network, the first authentication message comprising an indicator that the remote unit supports EAP Reauthentication Protocol ("ERP");

receiving a second authentication message from the network function in response to the first authentication message, the second authentication message comprising a key management domain name, the key management domain name indicating a group of network functions that can share reauthentication security context for the UE to perform ERP;

deriving a reauthentication security context in response to successful authentication with the mobile communication network, wherein the reauthentication security context comprises a reauthentication root key ("rRK") and a key identifier for the rRK, wherein the rRK is derived using a subscription permanent identity ("SUPI") of the UE and at least a serving network name or a home network identifier ("ID") of the UE; and storing, in a local memory, the key management domain name and the reauthentication security context for subsequent reauthentication with the mobile communication network.

16. The method of claim 15, further comprising deriving a reauthentication integrity key ("rIK") for securely exchanging and verifying ERP messages with the network function, the rIK derived at least in part from the key management domain name and a sequence number ("SEQ").

17. The method of claim 15, further comprising generating a NAI based on a key identifier for a reauthentication root key ("EMSKname") and a domain-name, wherein the NAI has a form of EMSKname@domain-name, and wherein the domain-name is generated using an identifier for a previously authenticated network gateway function in a trusted non-3GPP access network ("TNAN") and the key management domain name.

18. The method of claim 17, further comprising:

receiving a second key management domain name from a new access point in the TNAN; and in response to determining that a second key management domain name fails to match the stored key management domain name, transmitting a domain mismatch indicator to the new access point in an EAP-Initiate/RE-auth message to trigger initial EAP full authentication.

19. The method of claim 15, wherein the rRK is derived using a key derivation function based on an extended master session key ("EMSK"), the SUPI, and the serving network name or the home network ID, the method further comprising:

deriving a key identifier for the EMSK-based rRK ("EMSKname") using a key derivation function based on at least the SUPI and the serving network name or the home network ID.

20. The method of claim 15, wherein the rRK is derived using a key derivation function based on an authentication server function ("AUSF") key, the SUPI, and the serving network name or the home network ID, the method further comprising:

deriving a key identifier for the AUSF-based rRK ("Kausfname") for subsequent reauthentication procedures, wherein the Kausfname is derived using a key derivation function based on a SUPI, the serving network name or the home network ID, and the AUSF key.

* * * * *